United States Patent
Lombrozo et al.

(10) Patent No.: US 9,205,828 B1
(45) Date of Patent: Dec. 8, 2015

(54) METHOD AND APPARATUS FOR DETERMINING VEHICLE LOCATION BASED ON MOTOR FEEDBACK

(75) Inventors: Peter Craig Lombrozo, Santa Cruz, CA (US); Carsten Jensen, San Francisco, CA (US); Andrew Barton-Sweeney, Berkeley, CA (US); Russell Smith, Santa Clara, CA (US); Daniel Lynn Larner, San Jose, CA (US)

(73) Assignee: Google Inc., Mountain View, CA (US)

( * ) Notice: Subject to any disclaimer, the term of this patent is extended or adjusted under 35 U.S.C. 154(b) by 10 days.

(21) Appl. No.: 13/539,030

(22) Filed: Jun. 29, 2012

(51) Int. Cl.
*B60W 20/00* (2006.01)
*B60W 30/00* (2006.01)

(52) U.S. Cl.
CPC ............. *B60W 20/00* (2013.01); *B60W 30/00* (2013.01)

(58) Field of Classification Search
CPC ..... B60W 20/00; B60W 10/08; B60W 10/06; Y02T 10/6286; B60K 6/445
USPC ......... 701/1, 2, 22, 23, 25, 408, 41, 468, 470, 701/472, 50, 51; 290/40 C; 180/204; 705/39
See application file for complete search history.

(56) References Cited

U.S. PATENT DOCUMENTS

| 5,341,130 | A * | 8/1994 | Yardley et al. .................. 340/3.1 |
| 7,383,902 | B2 * | 6/2008 | Matsuzaki et al. ....... 180/65.285 |
| 8,041,535 | B1 * | 10/2011 | Kelly et al. .................... 702/151 |
| 2003/0050742 | A1 * | 3/2003 | Sakamoto et al. ................ 701/1 |
| 2003/0220731 | A1 * | 11/2003 | Zierolf ............................. 701/71 |
| 2004/0163860 | A1 * | 8/2004 | Matsuzaki et al. ........... 180/65.2 |
| 2005/0218312 | A1 * | 10/2005 | Thannikary .............. 250/231.13 |
| 2007/0202991 | A1 * | 8/2007 | Matsumura et al. .......... 477/174 |
| 2008/0078608 | A1 * | 4/2008 | Hara et al. ..................... 180/446 |
| 2008/0189012 | A1 * | 8/2008 | Kaufmann ....................... 701/41 |
| 2008/0309267 | A1 * | 12/2008 | Cheng ....................... 318/400.04 |
| 2010/0123426 | A1 * | 5/2010 | Nashiki et al. ................ 318/701 |
| 2010/0168940 | A1 * | 7/2010 | King ............................... 701/20 |
| 2010/0274607 | A1 * | 10/2010 | Carresjo et al. .................... 705/7 |
| 2011/0295457 | A1 * | 12/2011 | Linda et al. ..................... 701/29 |
| 2012/0109416 | A1 * | 5/2012 | Mizutani et al. .................. 701/1 |
| 2012/0185122 | A1 * | 7/2012 | Sullivan et al. ................ 701/23 |
| 2012/0245765 | A1 * | 9/2012 | Medwin et al. .................. 701/2 |
| 2012/0265439 | A1 * | 10/2012 | Radner ......................... 701/468 |
| 2013/0134967 | A1 * | 5/2013 | Kaufmann et al. ...... 324/207.25 |

OTHER PUBLICATIONS iPedia net: Free Information Center, "What is Derivatives of Displacement?", downloaded on Sep. 10, 2014 from <http://wearcam.org/absement/Derivatives_of_displacement.htm>.

* cited by examiner

*Primary Examiner* — Helal A Algahaim
*Assistant Examiner* — Jelani Smith
(74) *Attorney, Agent, or Firm* — Lerner, David, Littenberg, Krumholz & Mentlik, LLP

(57) ABSTRACT

A method and apparatus are provided for determining the location of a vehicle. According to one aspect the method and apparatus the movements of motor rotors in a vehicle are monitored and used to determine speed, travel distance and/or travel path of a vehicle may be determined. Using various navigation techniques, the distance and travel path may then be used to determine the vehicle's location. Furthermore, movements of the motor rotors may also be used to report the positions of the steering and drive systems for the purpose of informing the vehicle controller as a method of feedback.

20 Claims, 20 Drawing Sheets

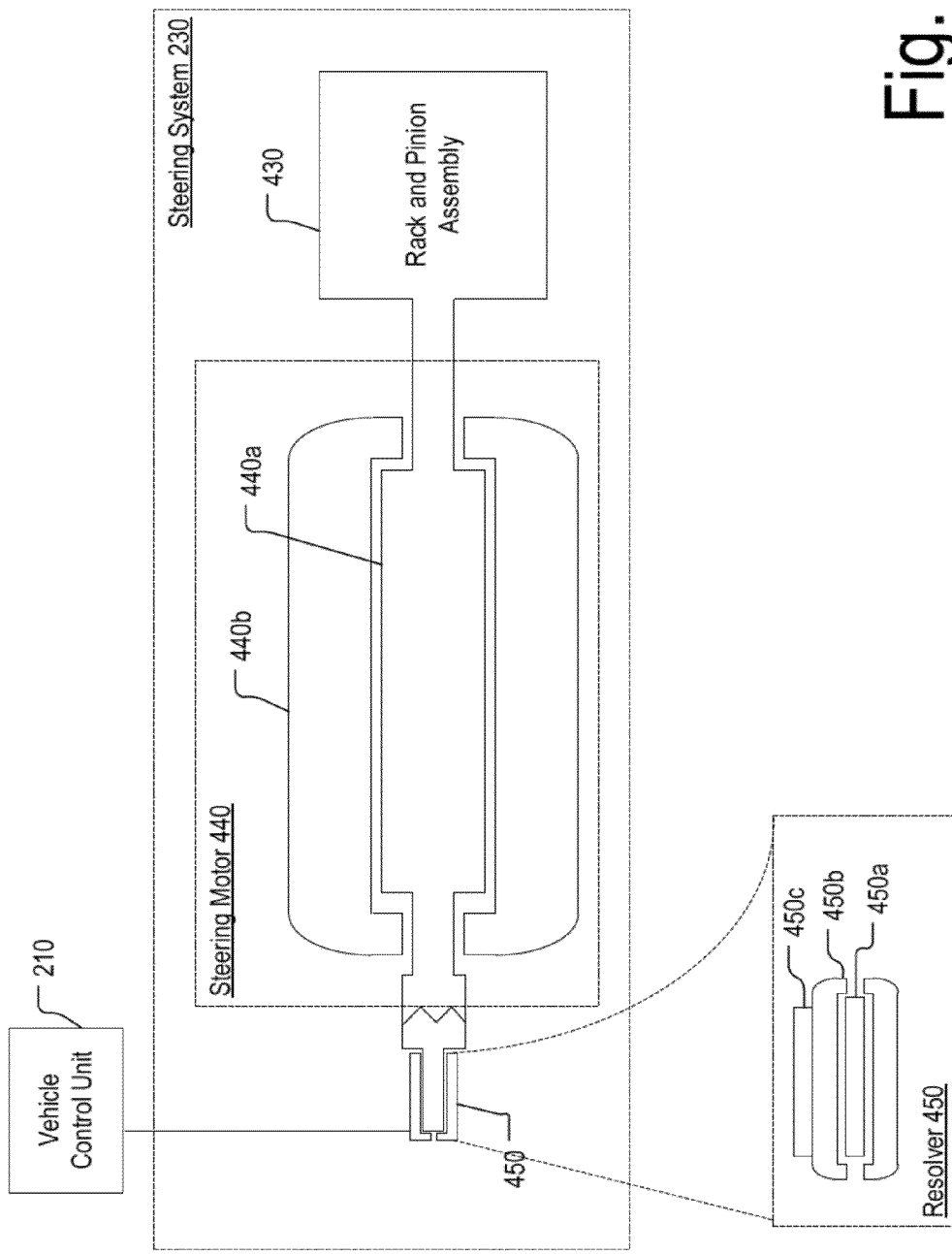

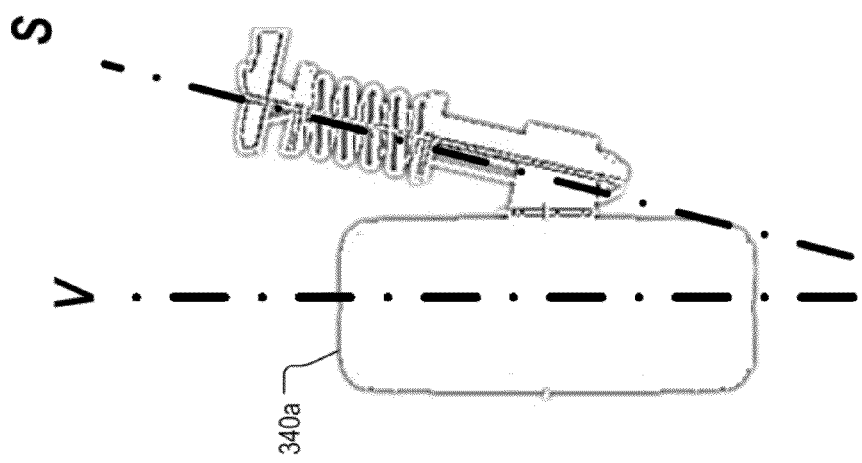
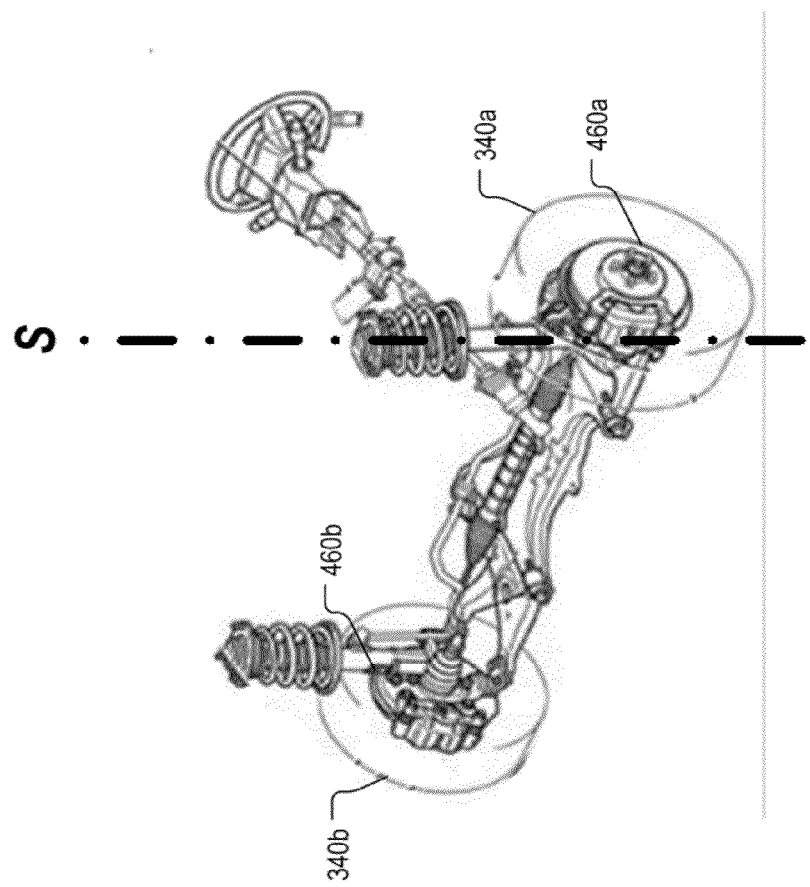
Fig. 4D
Fig. 4C

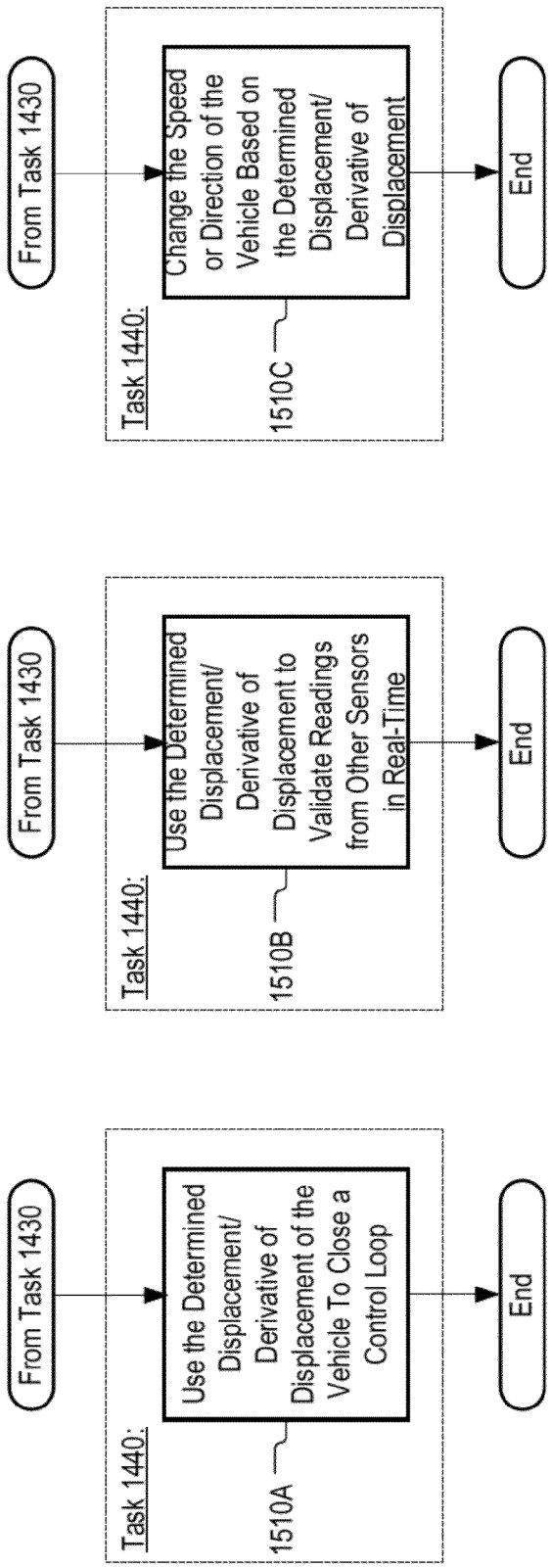

METHOD AND APPARATUS FOR DETERMINING VEHICLE LOCATION BASED ON MOTOR FEEDBACK

BACKGROUND

Autonomous vehicles use artificial intelligence to aid in the transport of passengers. When travelling from one location to another, autonomous vehicles may use inertial navigation systems to determine their location and ensure that they are following a correct course. Such inertial navigation systems may use a computer and motion sensors to continuously calculate, via dead reckoning, the position of vehicles on the road.

In some instances, the motion sensors may include wheel sensors for measuring the speed and direction of the wheels of autonomous vehicles. Using wheel sensors, however, may present several challenges. Wheel sensors are ordinarily attached to the wheels of vehicles where they are exposed to harsh operating conditions. For instance, wheel sensors may be easily damaged when a vehicle runs over a pothole or collides with a curb. Furthermore, some wheel sensors, such as those found in anti-lock braking systems (ABS), may be ambiguous when a vehicle changes from forward to reverse motion. Thus, the integration of wheel sensors may be challenging from a design perspective and it may drive up the complexity and cost of wheel assemblies used in vehicles that use inertial navigation.

SUMMARY

In one aspect, a vehicle is provided that includes an acceleration system, a steering system, a braking system, a power train, a displacement measuring device, and a processor. The power train includes an electric motor including a first rotor disposed within a first stator. The displacement measuring device is coupled to the first rotor. The processor is coupled to one or more of the steering system, the acceleration system, and the braking system. The processor is configured to receive, from the displacement measuring device, a signal that indicates an orientation of the first rotor relative to the first stator and determine at least one of displacement of the first rotor or a derivative of displacement of the first rotor based on the received signal. The processor is further configured to operate at least one of the braking system, the steering system, and the acceleration system based on the determined displacement of the first rotor or the derivative of the displacement of the first rotor. In some instances, the displacement measuring device may be a resolver. The signal may further indicate at least one of speed, direction of rotation, displacement, or acceleration of the first rotor.

The signal may further be sampled by the processor at a predetermined sampling rate. The displacement or derivative of displacement of the rotor may further be determined based on one or more signal samples. The displacement or derivative of displacement of the rotor may further be determined repeatedly at a rate of multiple times per second. The processor may further be configured to determine at least one of velocity, acceleration, and rate of acceleration of the vehicle based on the signal received from the displacement measuring device. The operation of at least one of the braking system, the steering system, and the acceleration system may further be based on the determined velocity, acceleration, and/or rate of acceleration of the vehicle.

The displacement measuring device may further include a second rotor coupled to the first rotor of the electric motor. The displacement or derivative of displacement of the first rotor may further be determined based on a speed ratio of the coupling between the first rotor and the second rotor. The vehicle may further include a clutch and the processor may be configured to detect whether the clutch is engaged or disengaged. The at least one of the braking system, the steering system, and the acceleration system may further be operated based on the determined displacement of the rotor or the derivative of the displacement of the rotor only when it is determined that the clutch is engaged.

In another aspect, a method for controlling the operation of a vehicle is provided. The vehicle includes a motor that is part of a power train. The motor includes a first rotor and a first stator. The method includes receiving a first signal that is produced by a first device and indicates a first value of at least one of location of the vehicle, displacement of the vehicle, or a derivative of the displacement of the vehicle. The method further includes receiving a second signal indicating an orientation of the first rotor relative to the first stator. The second signal is produced by a second device that is coupled to the first rotor. The method further includes determining, based on the first signal, at least one of an angular displacement of the first rotor and a derivative of the angular displacement the first rotor. The method further includes determining a second value of the at least one of a location of the vehicle, a displacement of the vehicle and a derivative of the displacement of the vehicle. The second value is determined based on the at least one of the angular displacement of the first rotor and a derivative of the angular displacement of the first rotor. The method further includes comparing the first value with the second value, and operating at least one of the braking system, the steering system, and the acceleration system based on the first signal only when it is determined that the first value matches the second value.

The first device may further be at least one of a speedometer, an accelerometer, or a geo-location receiver. The second device may further be one of a resolver or a rotary encoder. The first signal may further indicate at least one of speed, direction of rotation, displacement, location, or acceleration of the first rotor. The second value may further be determined based on a transfer function that compensates for misalignment between the first rotor and the displacement measuring device. In some instances the second signal may further be sampled at a predetermined sampling rate. The at least one of the angular displacement of the first rotor and the derivative of the angular displacement of the rotor is determined based on at least two samples of the second signal.

In yet another aspect, a steering system is provided that includes an electric steering motor, a braking system, an acceleration system, and a processor coupled to the steering system and the braking system. The electric steering motor is coupled to a first wheel hub and configured to rotate the first wheel hub about a steering axis. The electric steering motor includes a first rotor and a first stator. The processor is configured to receive a signal that indicates an orientation of the first rotor relative to the first stator, determine a location of the vehicle based on the signal, and operate at least one of the braking system, acceleration system, and the steering system based on the determined location of the vehicle. The signal may further indicate at least one of speed, direction of rotation, displacement, location, or acceleration of the first rotor. The displacement measuring device may further be one of a resolver or a rotary encoder.

The processor may further be configured to determine a displacement of the first wheel hub in a vehicle left-right direction based on the signal. The location of the vehicle may further be determined based on the determined displacement. The processor may further be configured to determine a steering position of the first wheel hub based on the signal. The location of the vehicle may be determined based on the steering position. The vehicle may further include a displacement measuring device that includes a second rotor coupled to the first rotor of the electric steering motor. The location of the vehicle may further be determined based on a function that removes noise in the signal that results from a misalignment between the first rotor and the second rotor.

In yet another aspect, a method is provided for controlling a vehicle. The method includes receiving a first signal. The first signal is indicative of at least one of an angular displacement of a first rotor or a derivative of the angular displacement of the first rotor. The first rotor is part of an electric steering motor that is part of a steering system of the vehicle. The method further includes determining at least one of an angular displacement of the first rotor and a derivative of the angular displacement the first rotor. The determination is based on the first signal. The method further includes determining a first value of location of the vehicle, a displacement of the vehicle and/or a derivative of the displacement of the vehicle. The first value is determined based on angular displacement of the first rotor and/or a derivative of the angular displacement of the first rotor. The method further includes receiving a second signal indicating a second value of at least one of location of the vehicle, displacement of the vehicle, or a derivative of the displacement of the vehicle, comparing the first value with the second value, and operating at least one of the braking system, the steering system, and the acceleration system based on the second signal only when it is determined that the first value matches the second value. The second signal is produced by a first device. In some instances, the first signal may further be received from a displacement measuring device, such as one of a resolver or a rotary encoder. The first signal may further be adjusted using a transfer function that compensates for misalignment between the first rotor and the displacement measuring device.

BRIEF DESCRIPTION OF THE DRAWINGS

FIG. 4B depicts another schematic diagram of the steering system of the autonomous vehicle of FIG. 1.

FIGS. 4C-4D depict schematic diagrams showing a steering axis of a wheel of the vehicle of FIG. 1.

FIGS. 15A-C depict flowcharts of processes associated with the process of FIG. 14.

DETAILED DESCRIPTION

Figure 1:
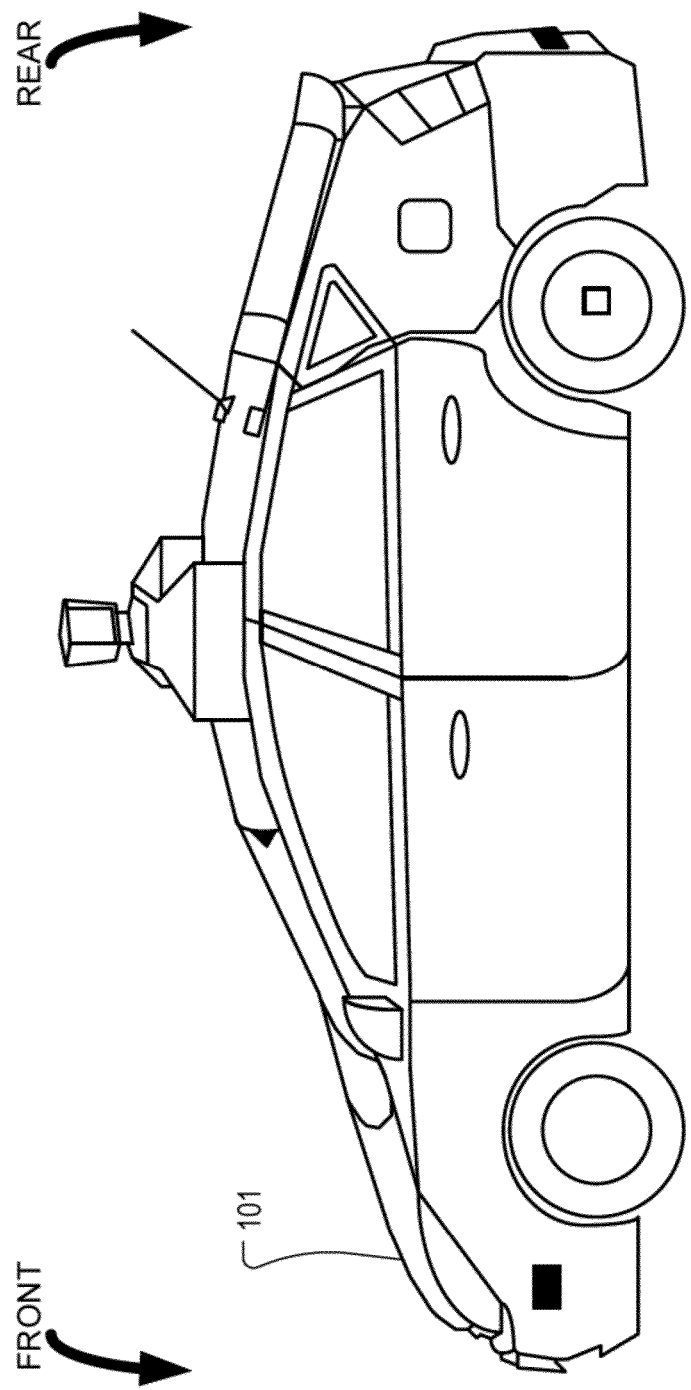
FIG. 1 depicts a schematic diagram of an autonomous vehicle in accordance with aspects of the disclosure.
Figure 2:
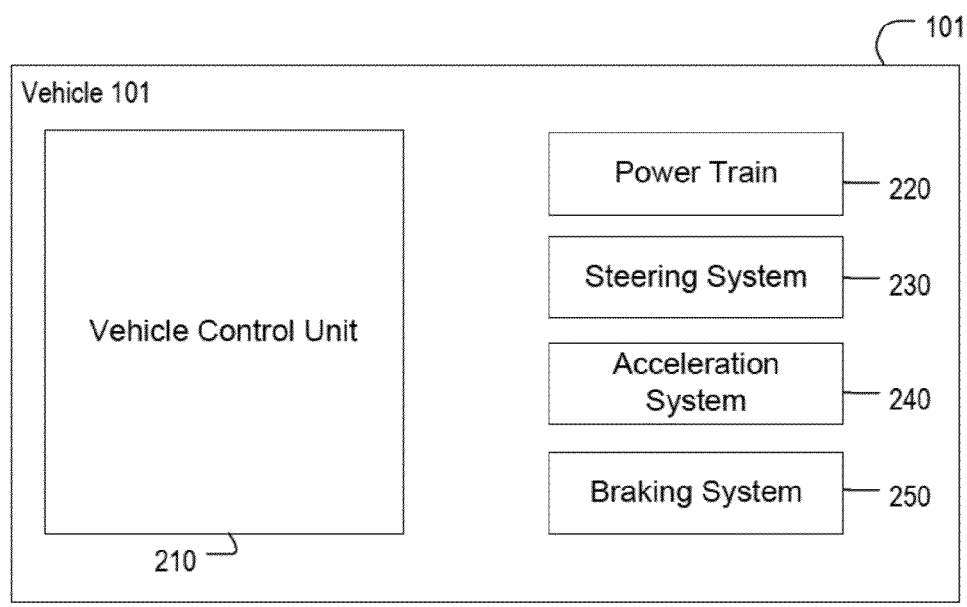
FIG. 2 depicts a schematic diagram of the autonomous vehicle of FIG. 1.

FIG. 1 depicts an autonomous vehicle 101 that is capable of driving from one point to another without (or with partial) input from a human driver. In this example, vehicle 101 is an automobile, but in other examples vehicle 101 may be a car, truck, motorcycle, bus, boat, airplane, helicopter, lawnmower, recreational vehicle, amusement park vehicle, farm equipment, construction equipment, tram, golf cart, train, trolley, glider, warehouse equipment, factory equipment, or the like. As shown in FIG. 2, vehicle 101 may include vehicle control unit 210, power train 220, steering system 230, acceleration system 240, and braking system 250. Vehicle control unit 210 may be a system for controlling the operation of vehicle 101. Vehicle control unit 210 may interact with braking system 250, steering system 230, and acceleration system 240 to cause vehicle 101 to slow down, stop, steer, or accelerate when navigating the vehicle 101 towards a predetermined destination. In some aspects, the vehicle control unit may be configured to perform one or more of the tasks discussed with respect to FIGS. 6-10. The structure of the vehicle control unit 210 is further discussed with respect to FIG. 5.

Figure 3A:
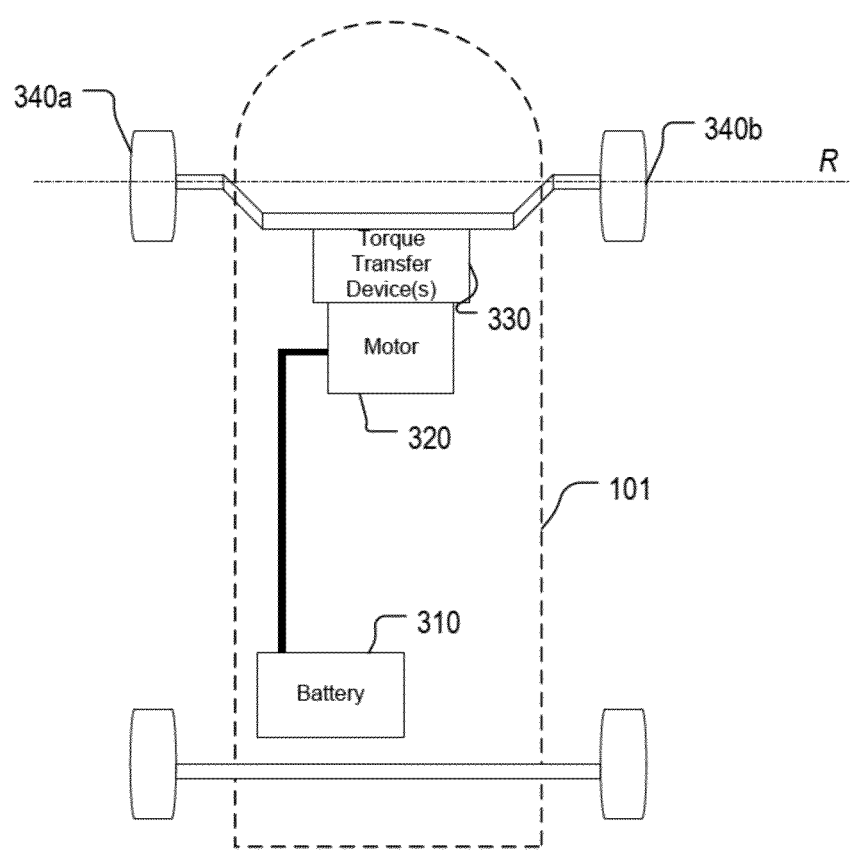
FIG. 3A depicts a schematic diagram of a power train system of the autonomous vehicle 101 in accordance with aspects of the disclosure.
Figure 3B:
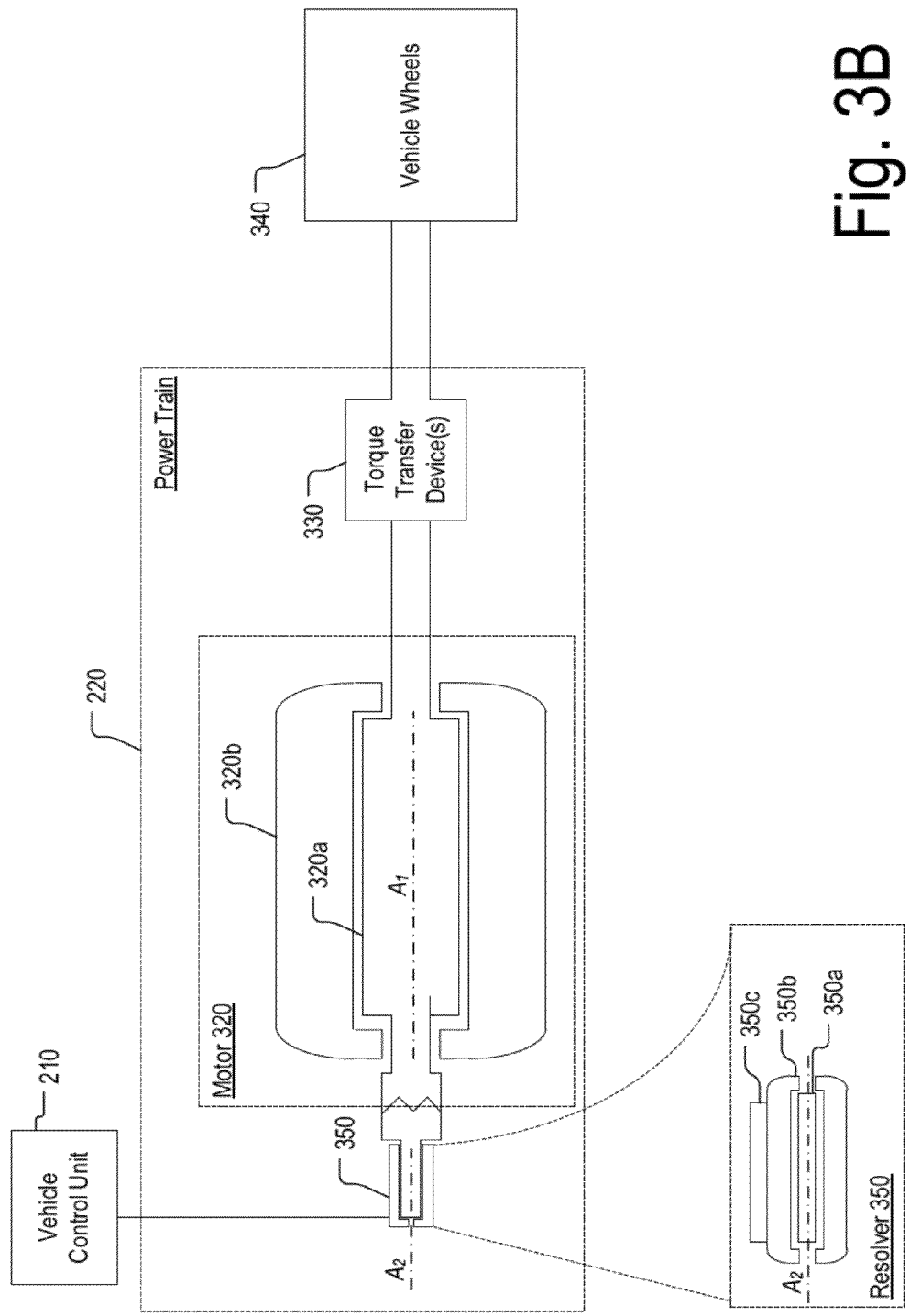
FIG. 3B depicts another schematic diagram of a power train system of the autonomous vehicle 101 in accordance with aspects of the disclosure.

Referring to FIGS. 3A-B, the power train 220 may include a battery 310, motor 320, and one or more torque transfer device(s) 330. The battery 310 may be a nickel metal hydride battery or any other type of battery. The motor 320 may be an electric motor that is electrically coupled to the battery 310. Torque transfer device(s) 330 may include a transmission, drive axel, or any other mechanical component used to deliver torque from the motor 320 to the wheels 340a-b of the vehicle 101.

Referring to FIG. 3B, the motor 320 may include a rotor 320a disposed within the bore of a stator 320b. The rotor 320a may have a permanent magnetization with a flux direction perpendicular to the axis of the bore. The stator may include coils connected in a WYE or delta configuration and placed around the circumference of the stator 320b. The coils may be arranged in pairs diametrically opposed to one another. When the coils are driven, they may provide a magnetic field directed transverse to the bore axis and which rotates about the axis. The magnetic field will interact with the magnetic field of the rotor 320a causing the rotor to turn. The turning motion of the rotor 320a may be transferred by the torque transfer device(s) 330 to the vehicle wheels 340 thereby causing the wheels 340a and 340b to rotate about the axis R.

Resolver 350 may monitor the movement of the rotor 320a and output to the vehicle control unit 210 a signal that is indicative of the angular displacement of the rotor 320a. As illustrated, the resolver 350 may include a rotor 350a, stator

Figure 3D:
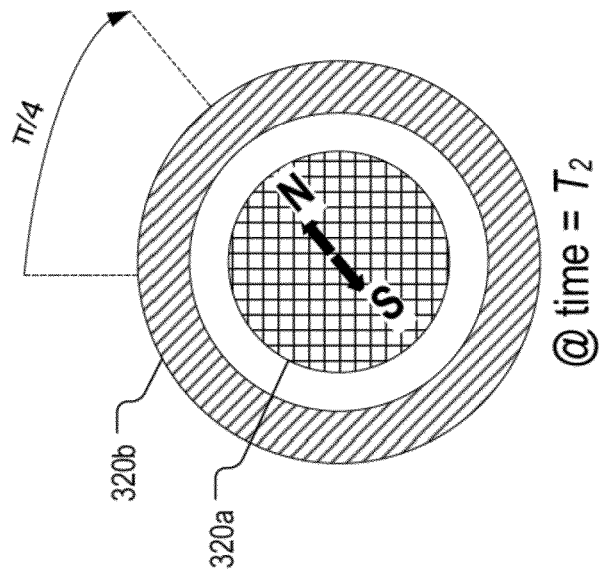
FIGS. 3C-D depict cross-sectional diagram of an electric motor of the vehicle 101 at time instants $T_1$ and $T_2$.
Figure 3C:
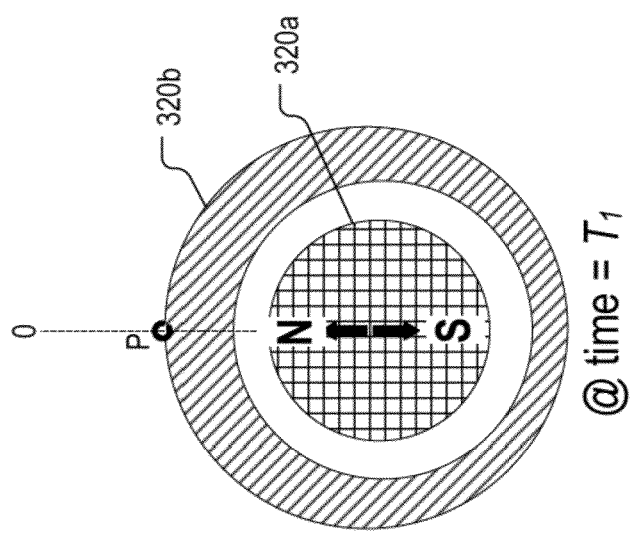

350b, and controller circuit 350c. The rotor 350a may be disposed within the bore of the stator 350b and it may be coupled to the rotor 320a. When the rotor 350a is actuated by the rotor 320a, the controller circuit 350c may generate an analog or digital code indicating one or more characteristics of the movement of the rotor. For example, the code may indicate the position or orientation of the rotor 320a within the stator 320b (e.g., in polar or Cartesian coordinates). As another example, the code may indicate velocity, displacement, speed, direction of rotation, or acceleration. As illustrated in FIGS. 3C and 3D, when the rotor 320a moves, the resolver 350 may report to the vehicle control unit 210 that at time $T_1$ the rotor 320a has orientation 0 and at time $T_2$ the rotor has orientation n/4. In instances where the signal from the resolver is an analog signal, the indication of displacement may be encoded using the frequency, amplitude, phase, or another characteristic of the signal. In instances where the signal from the resolver is a digital signal, the indication of displacement may be a bit string (e.g., "01011").

In some situations, the coupling of the rotor 350a to the rotor 320a may be misaligned thereby causing noise to appear in the signal output by the resolver 350. To prevent such noise from affecting its operation, in one aspect, the vehicle control unit 210 may apply a transfer function to data received from the resolver 350 before further using that data. The transfer function may map indication(s) of the orientation(s) of the rotor 320a reported by the resolver 350 to a "true" orientation of the rotor. The transfer function may be derived using a brute force approach where speed data from the vehicle 101 is collected while the vehicle is run at a known constant (or nearly constant) speed, as measured by a speedometer or some other device, while data from the resolver is being collected. Afterwards, the data from the resolver may be processed so as to find a function that minimizes the power spectral density (PSD) of the signal from the resolver while retaining a frequency in that signal that corresponds to the speed of the rotor 320a. The frequency corresponding to the speed of the rotor 320 is the most present frequency in the resolver signal's spectrum and it has been found to correctly reflect the speed of the vehicle regardless of whether noise is also present.

By way of example, the processing of the data may involve finding a filter function that retains the frequency in the resolver signal that correctly reflects the rotor's position (and thus the vehicle's speed) while removing frequencies associated with noise. The function may be identified by trying different filter models (or the same model, but with different parameters) until a function is found that works. Whether a function works may be determined by using signal that is filtered with the function to determine the speed of the vehicle, and comparing the determined speed to the speed measured using the speedometer or some other device. Similarly, the most present frequency may be identified by an operator looking at a frequency decomposition plot of the signal from the resolver 350a or by filtering different frequencies from the signal and determining which frequency is best suited for determining the speed of the vehicle 101, as discussed above.

In other aspects, the vehicle control unit 210 may use signal from the resolver 350 to determine the velocity (or angular displacement, acceleration) of the rotor 320a. The vehicle control unit 210 may then use that data to calculate the velocity of the wheels 340. For example, the velocity of the wheels may be determined by multiplying the velocity of the rotor 320a by a speed ratio of the torque transfer device(s) 330. Once the velocity of the wheels is determined, it may be used to determine distance traveled by the vehicle 101. The distance traveled, in turn, may be used by the vehicle control unit 210 to determine the vehicle's location provided that a starting location and travel path of the vehicle are known.

Figure 4A:
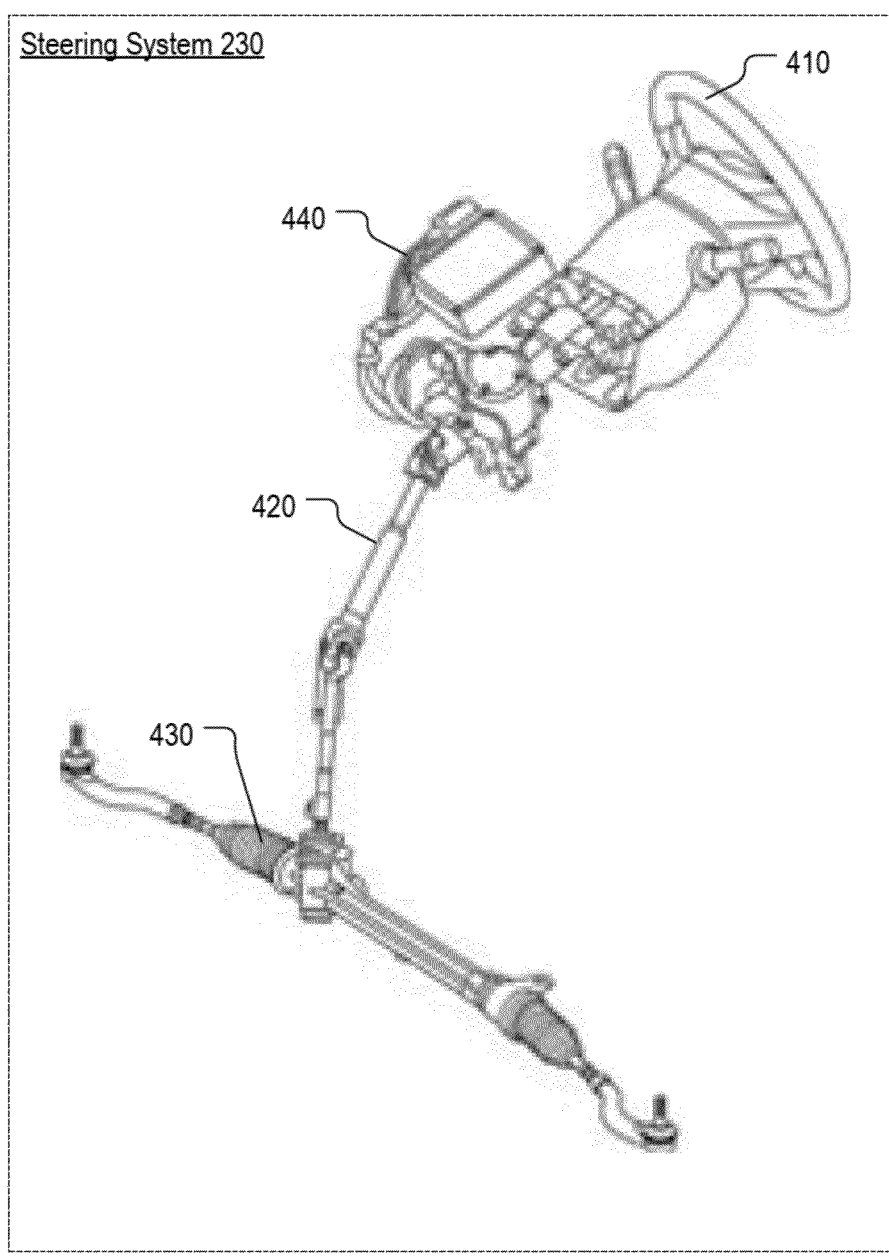
FIG. 4A depicts a schematic diagram of a steering system that is part of the autonomous vehicle of FIG. 1.

FIG. 4A depicts an exemplary schematic diagram of the steering system 230 of the vehicle 101. In this example, the steering system 230 may include a steering wheel 410 coupled to a rack and pinion assembly 430 via a steering column 420. Steering motor 440 may be an electric motor coupled to the steering column 420 (or another steering system component) and used to augment torque applied to the steering wheel 410. Although, in this example, the steering system 230 is a power steering system, in other examples, the steering system 230 may be a steering-by-wire system, a steering system where the steering motor 440 is the sole source of torque, or any other system that includes an electric motor configured to actuate the wheels 340a and 340b in either the vehicle left or vehicle right direction.

As illustrated in FIG. 4B, the steering motor 440 may include a rotor 440a disposed within the bore of a stator 440b. The rotor 440a may have a permanent magnetization with flux direction perpendicular to the axis of the bore. The stator may include coils connected in a WYE or delta configuration and placed around the circumference of the rotor 440b. The coils may be arranged in pairs diametrically opposed to one another. When the coils are driven, they may provide a magnetic field directed transverse to the bore axis and which rotates about the axis. The magnetic field will interact with the magnetic field of the rotor 440a causing the rotor to turn. The turning motion of the rotor 440a may be transferred (e.g., via the rack and pinion assembly and the wheel hubs 460a and 460b) to the vehicle wheels 340a and 340b, thereby causing the wheels, and the wheel hubs 460a and 460b, to rotate about a steering axis S (as shown in FIGS. 4C-D) in the vehicle left-right direction. The precise definition of steering axis may differ depending on the type of suspension used, but on a MacPherson strut suspension, the steering axis S may run through a wheel's lower ball joint and an upper strut mount or bearing plate.

Resolver 450 may include a rotor 450a, stator 450b, and controller circuit 450c. The rotor 450a may be disposed within the bore of the stator 450b and it may be coupled to the rotor 440a of the motor 440. When the rotor 450a is actuated by the rotor 440a, the controller circuit 450c may generate, and feed to the vehicle control unit 110, an analog or digital code indicating a characteristic of the movements of the rotor. For example, the code may indicate the position of the rotor 440a within the stator 440b (e.g., in polar or Cartesian coordinates). As another example, the code may indicate velocity, displacement, speed, direction of rotation, or acceleration. In instances where the signal from the resolver is an analog signal, the indication of displacement may be encoded using the frequency, amplitude, phase, or another characteristic of the signal. In instances where the signal from the resolver is a digital signal, the indication of displacement may be a bit string (e.g., "01011").

Figure 4E:
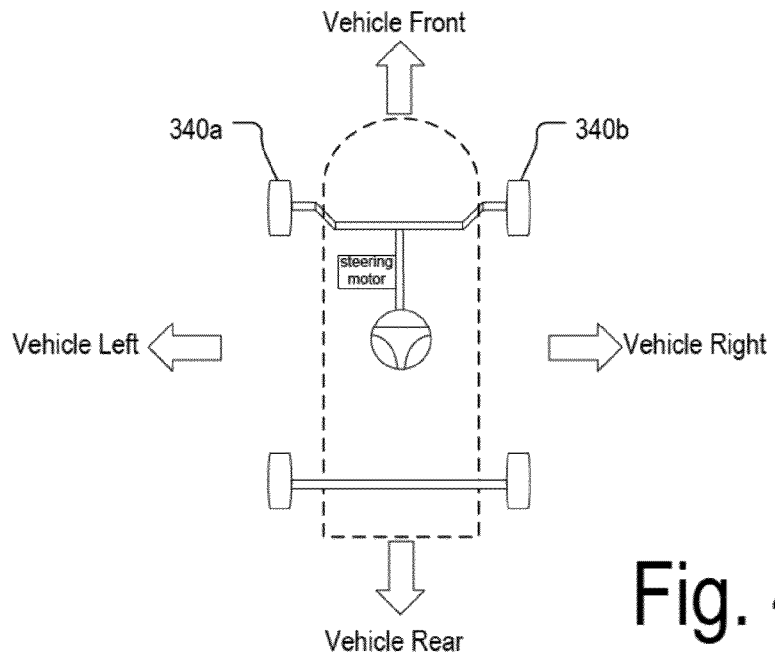
FIGS. 4E-G depict schematic diagrams of the vehicle of FIG. 1 that illustrate different steering positions of the wheels of the vehicle.
Figure 4F:
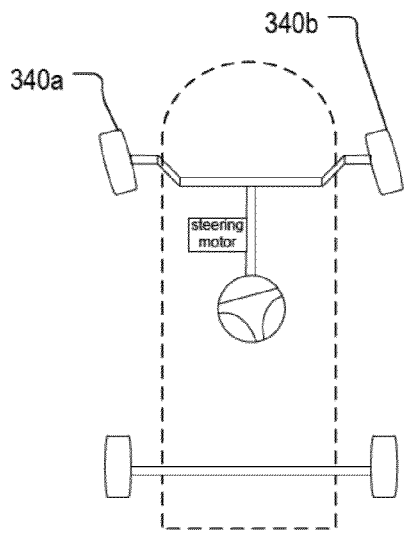
Figure 4G:
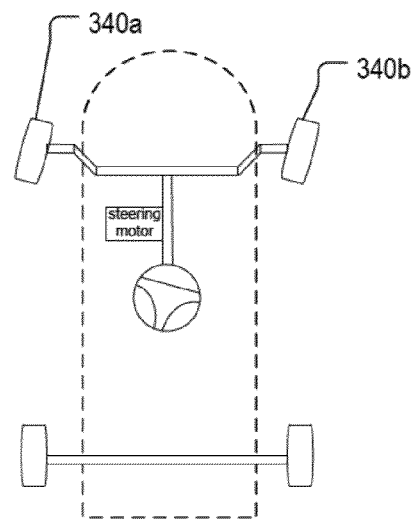

FIGS. 4E-G depict an example of the operation of the steering system 230. FIG. 4E depicts a schematic diagram of the vehicle 101 with the wheels 340a and 340b in a neutral steering position. In some aspects, the neutral steering position of a wheel is a position of the wheel that causes the vehicle 101 to move in a straight line. FIG. 4F depicts a schematic diagram of the vehicle 101 with the wheels 340a and 340b pointed in the vehicle left direction. Similarly, FIG. 4G depicts a schematic diagram of the vehicle 101 with the wheels 340a and 340b turned in the vehicle right direction.

In operation, the vehicle control unit 210 may determine the direction in which the wheels of the vehicle 101 are pointing based on signal feedback from the resolver 450. For example, if the signal feedback indicates that the rotor 440a has turned 4 times to the left, the vehicle control unit 210 may determine that the wheels of the wheel point at 10° to the left (relative to a neutral steering position). By tracking the direction in which the wheels are pointing, the vehicle control unit 210 may obtain information regarding the path followed by the vehicle 101 as it travels. The travelling path, in turn, may be used to determine the location of the vehicle relative to a known starting point. In one aspect, the orientation of the steering motor can be used to determine the orientation of the steering system as a method of closing the loop of the control system when commanding a motion. It can also be used to determine the desired steering input to the vehicle, which precedes the actual direction change of the vehicle. Depending on the level of traction and speed of the vehicle, the angular measurement may not be the same as the direction of travel, but it could be used to augment other sensors. If there is a large discrepancy, it could inform the processor to rely more heavily on other sensors for determining vehicle position.

Figure 5:
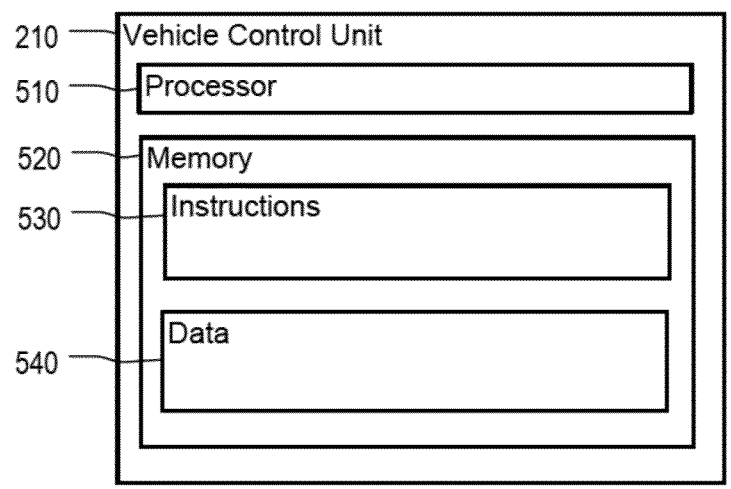
FIG. 5 depicts a schematic diagram of a vehicle control unit of the vehicle of FIG. 1.

As shown in FIG. 5, vehicle control unit 210 may include a processor 510 and memory 520. Memory 520 of vehicle control unit 210 stores information accessible by processor 510, including instructions 530 that may be executed by the processor 510. The memory also includes data 540 that may be retrieved, manipulated or stored by the processor. The memory may be of any type of tangible media capable of storing information accessible by the processor, such as a hard-drive, memory card, ROM, RAM, DVD, CD-ROM, write-capable, and read-only memories. The processor 510 may be any well-known processor, such as commercially available processors. Alternatively, the processor may be a dedicated controller such as an ASIC.

The instructions 530 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 540 may be retrieved, stored or modified by processor 510 in accordance with the instructions 530. For instance, although the system and method are not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 5 functionally illustrates the processor and memory as being within the same block, the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

Figure 6:
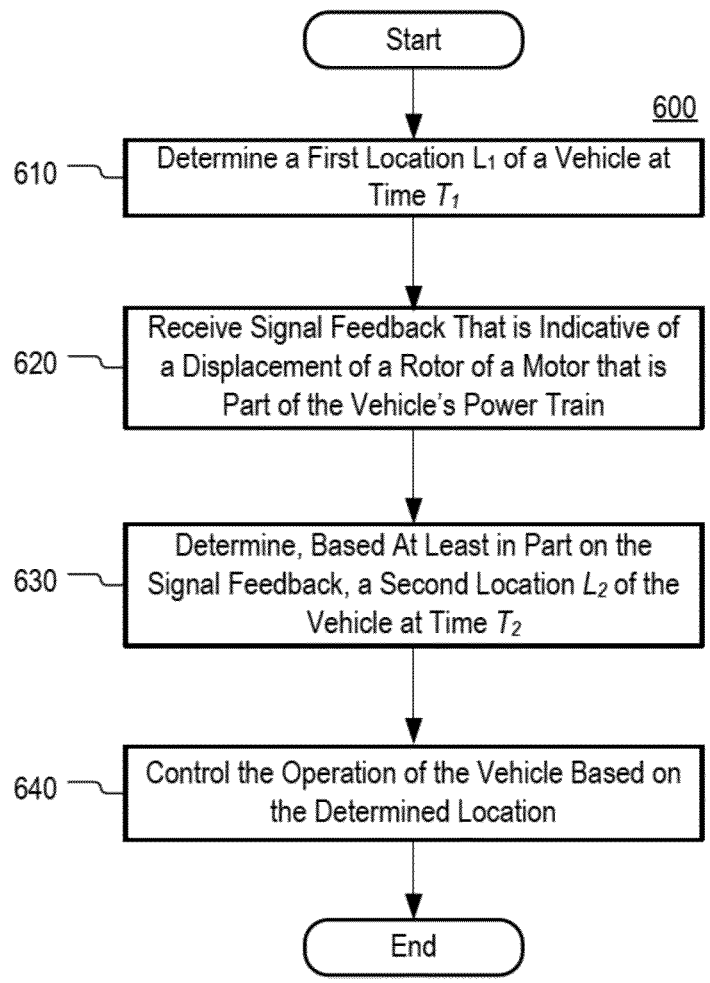
FIG. 6 depicts a flowchart of a process in accordance with aspects of the disclosure.

FIG. 6 depicts a flowchart of a process 600 in accordance with aspects of the disclosure. At task 610, a location $L_1$, where the vehicle 101 is situated at time $T_1$, is determined. At task 620, signal feedback is received that is indicative of displacement of the rotor 320a. The signal feedback may include one or more digital signals or one or more analog signals or a combination of analog and digital signals.

In some aspects, each one of the digital/analog signals that is indicative of a displacement of the rotor 320a may be at least one of:

A1: a signal indicating a velocity of the of the rotor (e.g., speed and direction of the rotor);

A2: a signal indicating displacement of the rotor (e.g., 480°) during a predetermined time period;

A3: one or more signals that indicate orientation of the rotor at different time instants (e.g., orientation of rotor at time $T_1$ and orientation of the rotor at time $T_2$);

A4: a signal that indicates acceleration of the rotor;

A5: a signal that indicates a direction in which the rotor moves (e.g., clockwise or counterclockwise); and A6: a signal that indicates any other characteristic of the movement of the rotor 320a that affects the rotor's displacement.

In other aspects, the source of the signal may be one of:

B1: a resolver, such as the resolver 350;

B2: a rotary encoder;

B3: a controller circuit that is used to drive the coils of the motor 320 (e.g., signals used by the controller or another component to drive individual coils may be tapped into and used to determine rotor position, speed, acceleration, or another characteristic of movement; alternatively, Back Electromotive Force (BEMF) in one or more of the coils of the rotor 120 may be measured and used to determine the rotor's position, speed, or acceleration, or another characteristic of movement; and B4: any other displacement measuring device that is capable of returning one of the signals A1-A6.

It should be noted that the disclosure is not limited to any specific type of signal that is indicative of the angular displacement of the rotor 320a within the stator 320b. Furthermore, there are numerous ways to measure the angular displacement of a rotor (or another characteristic of the movement of the rotor, such as position, speed, direction of movement) and the disclosure is not limited to any specific one of them.

Specifically, in this example, at task 620, a first code and a second code are received from the resolver 350. The first code may be a coordinate that indicates the position of the rotor 320a within the stator 320b at time $T_1$. Similarly, the second code may be a coordinate that indicates the position of the rotor 320a within the stator 320b at time $T_2$. The codes may be either digital or analog. For instance, referring to FIGS. 3C-D, the first code may indicate that at time $T_1$ the rotor is at position "0" and the second code may indicate that at time $T_2$, the rotor is at "n/4," wherein $T_2 < T_1$. In some aspects, the duration of the period $T_1$-$T_2$ may be less than the period it takes the rotor 320a to complete a single revolution. By way of example only, the position of the rotor may be expressed in reference to a magnetic axis of the rotor 320a and a reference point P on the stator 320b as illustrated in FIGS. 3C-D. (e.g., as an angle between the magnetic axis and an axis passing across the point P and the center of the rotor 320a.)

At task 630, a location $L_2$ of the vehicle is determined based on the signal feedback received at task 620. The location $L_2$ may be a location where the vehicle 101 is situated at time $T_2$ or another time that is different than the time $T_2$. In one aspect of task 630, a characteristic of the movement of the rotor 320a (e.g., displacement, velocity, speed, direction, or acceleration), may be determined based on the signal feedback received at task 620 and this characteristic may be mapped to a characteristic of the movement of vehicle 101 (or the vehicle's wheels), such as displacement, velocity, speed, direction, or acceleration. Once determined, the characteristic of the movement of the vehicle's wheels may be used to determine how far from the location $L_1$ the vehicle 101 has (or will be) departed at a given time instant. Task 630 is further discussed with respect to FIG. 7.

In another aspect of task 630, a transfer function for mapping a characteristic of the movement of the rotor 320a (e.g., speed of the rotor 320a, location of the rotor 320a within the stator 320b, acceleration of the rotor 320a) to a characteristic of the movement of vehicle 101 (or one or more wheels of the vehicle 101) may be used. The characteristic may be speed, acceleration, rate of acceleration, displacement, or any other derivative of displacement. For instance, the transfer function may be derived analytically based on the physics of the torque transfer device(s) 330 and other relevant components of the vehicle 101. Alternatively, the transfer function may be determined empirically by travelling one or more predetermined distances with the vehicle 101, recording signals received from the resolver 350 when each of the distances is traveled, and fitting the transfer function based on the predetermined distances and the received signals.

At task 640, the operation of the vehicle 101 is controlled based on the determined location $L_2$. For example, the vehicle control unit 210 may use the braking system 250 and the steering system 230 to slow down or steer the vehicle 101. As there are numerous ways in which systems in a vehicle may benefit from knowledge of the vehicle's location, the disclosure is not limited to any specific use of the location $L_2$ determined at task 630.

Figure 7:
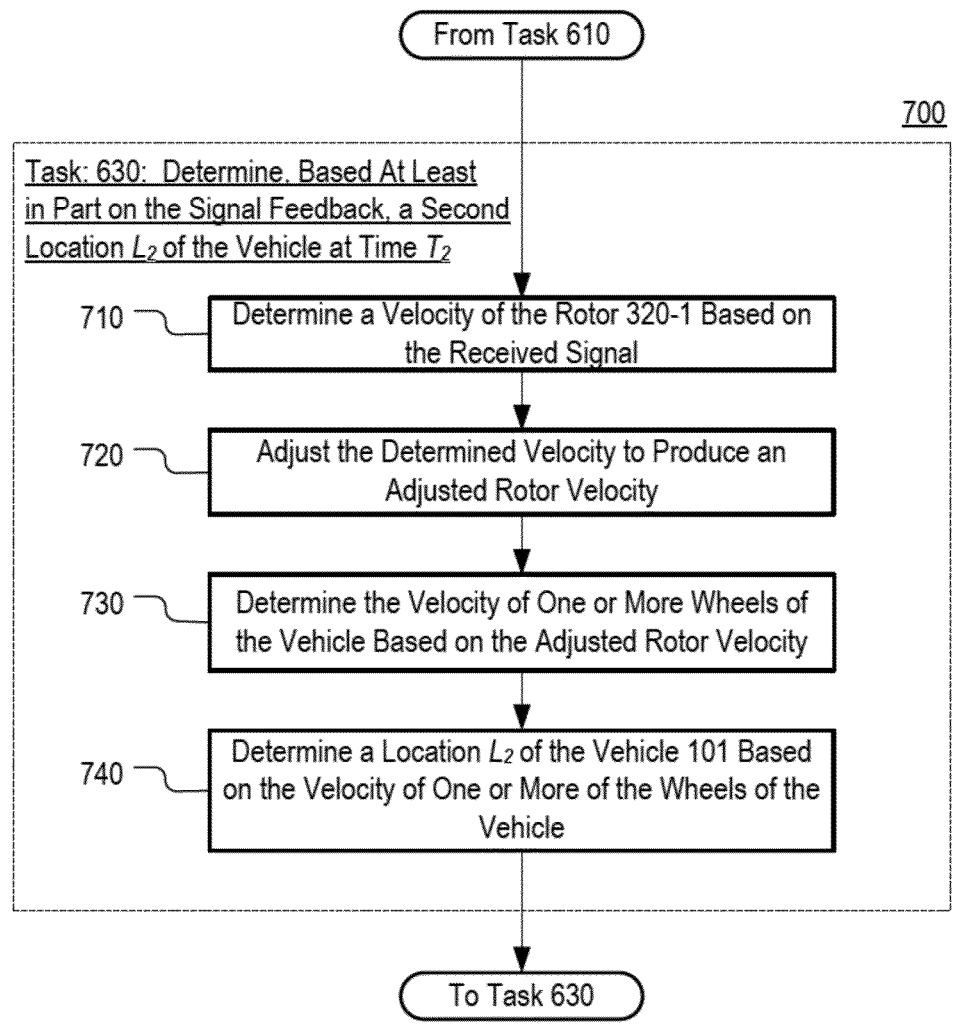
FIG. 7 depicts a flowchart of a process associated with the process of FIG. 6.

FIG. 7 depicts a flowchart of an example process 700 directed to determining the location of the vehicle 101, as specified by task 630 of FIG. 6. At task 710, the velocity of the rotor 320a is determined based on the coordinates received at task 620.

At task 720, the determined velocity is adjusted. Task 720 is further discussed with respect to FIG. 8. At task 730, the velocity of one or more wheels of the vehicle 101 is determined. For instance, the speed of the rotor 320a may be multiplied by a speed ratio of the torque transfer device(s) 330 to determine the speed of the one or more vehicle wheels. Furthermore, in some instances, an additional determination may be made as to whether the vehicle is performing a turn during the time period $T_1$-$T_2$. If the vehicle is turning and the vehicle has a differential, the physical characteristics (e.g., speed ratio, leverage) of the differential may be accounted for in determining the velocity of each of the front wheels 340a and 340b.

In this example, based on the information received at task 620, the vehicle control unit 210 may determine that the rotor 320a has turned a quarter of a turn and it may divide this information by the duration of the period $T_1$-$T_2$. Once the speed of the rotor 320a is determined, the speed of the vehicle 101a (or its wheels) may be calculated based on the speed of the rotor 320a and the mechanical characteristics of the torque transfer device(s) 330. In that regard, by monitoring the rotation of the rotor 320b with the resolver 350, the vehicle control unit 210 may accurately determine the speed of the vehicle 101.

At task 740, a location $L_2$ of the vehicle 101 is determined, via dead reckoning, based on the velocity determined at task 730. For example, when the vehicle 101 is travelling along a travel path such as the one depicted in FIG. 11, the velocity determined at task 730 may be used to determine how far the vehicle has traveled from the location $L_1$. Provided that the shape of the vehicle's travel path is known, determining the location $L_2$ based on the velocity of the vehicle 101's wheels and the location $L_1$ is a matter of a simple mathematical calculation. The travel path of the vehicle may be determined using the process 900 discussed below with respect to FIG. 9, or by using a gyroscope, accelerometer, or another similar device. The mechanical relationships between the motor of a vehicle and the vehicle's wheels, may vary depending on the vehicle's design, but regardless of what they are, in the vast majority of instances they are very well understood by vehicle designers. Accordingly, various characteristics of the movement of the rotor 320a may be mapped to characteristics of the movement of the vehicle 101 without departing from the full scope of the disclosure.

It should be noted that a number of different intermediate calculations may be performed when determining the location of the vehicle 101 based on signal feedback indicating the angular displacement of the rotor 320a within the stator 320b. In one aspect, instead of determining the velocity of the rotor 320a, the angular displacement of the rotor may be determined instead. In another aspect, instead of determining the velocity of the wheels, the angular displacement of the wheels. The disclosure, thus, is not limited to any specific method for correlating signal feedback indicative of the rotor's angular displacement to a characteristic of the vehicle 101's movements (e.g., distance travelled, speed, direction).

Figure 8:
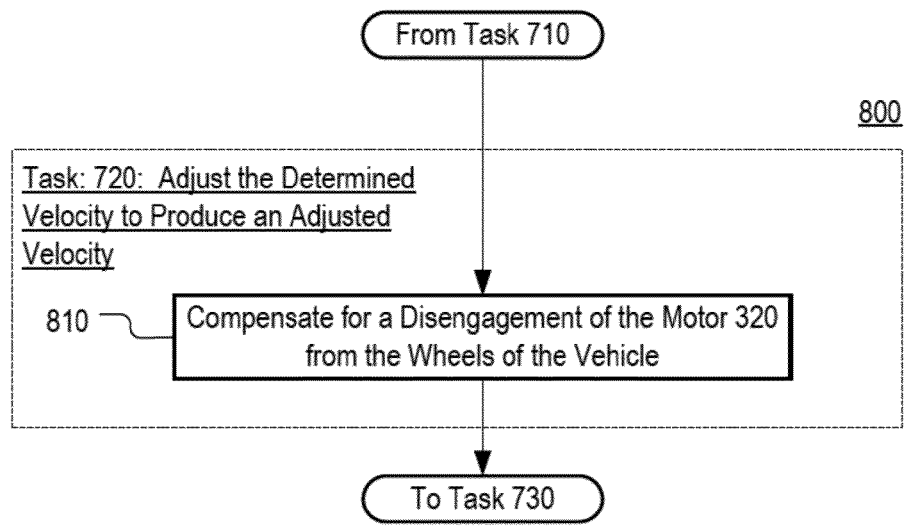
FIG. 8 depicts a flowchart of another process associated with the process of FIG. 6.

FIG. 8 depicts a flowchart of an example process 800 associated with adjusting the velocity determined at task 720. At task 810, an adjustment is performed that compensates for a disengagement of a clutch device on the train that connects the motor 320 to the wheels 340. In general, when a clutch on the train connecting the motor 320a to the wheels 340 is disengaged, the mechanical link between the movement of the rotor 320a and the wheels 340 is severed. Thus, at task 810, a signal may be received from a sensor associated with the clutch device that indicates that the clutch is disengaged during the period $T_{1+A}$-$T_{1-B}$, wherein $T_{1+A}$<$T_{1+B}$<$T_2$. In response to the signal, signal from wheel speed sensors that are part of an Antilock Braking System (ABS) of the vehicle 101 may be used to estimate the speed of the vehicle in the period for which the motor 320a is disengaged from the wheels 340.

Figure 9:
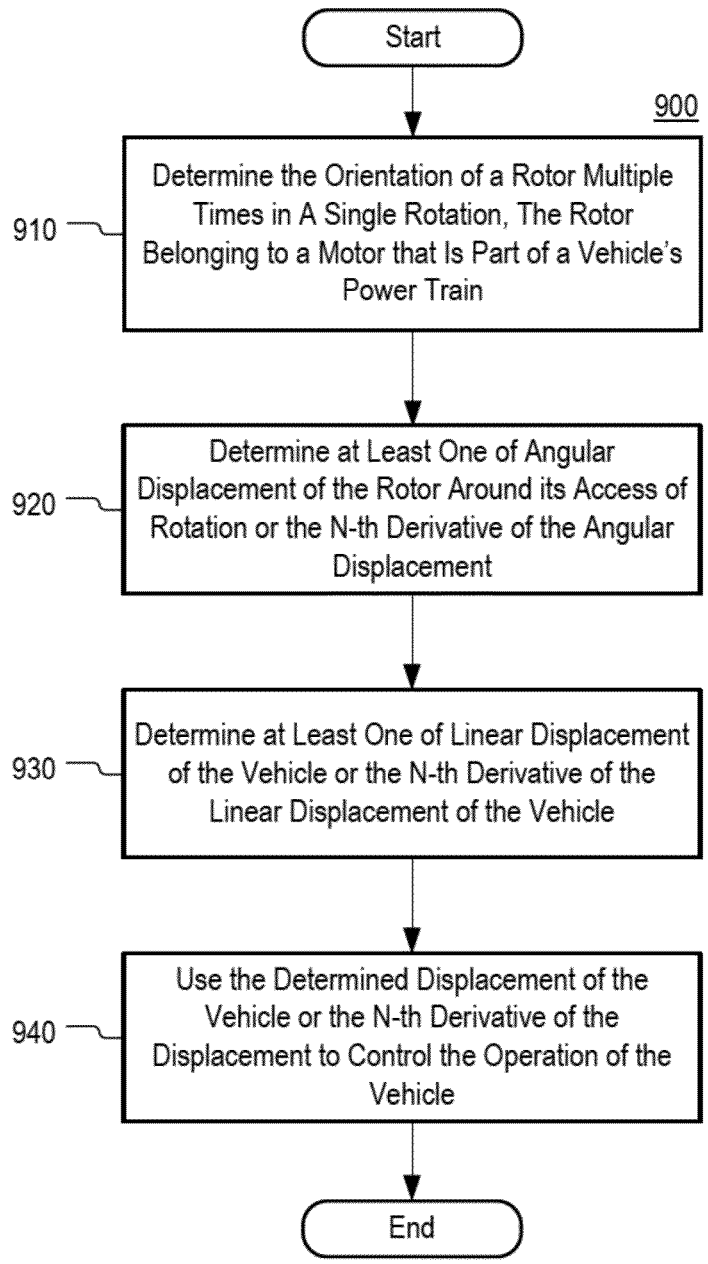
FIG. 9 depicts a flowchart of another process in accordance with aspects of the disclosure.
Figure 10:
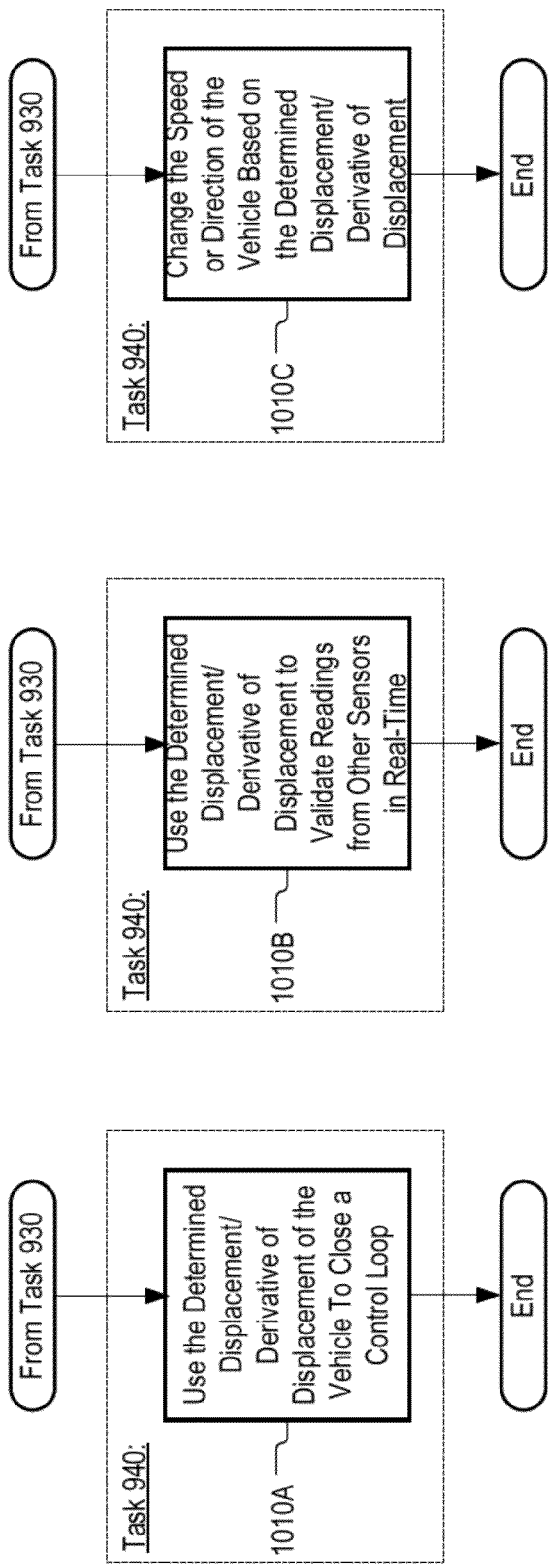
FIGS. 10A-C depict flowcharts of processes associated with the process of FIG. 9.

FIG. 9 depicts a flowchart of a process 900 in accordance with aspects of the disclosure. At task 910, the orientation of the rotor 320a is determined by sampling the signal from the resolver 350 (or another measuring device) at a predetermined sampling rate. The sampling rate in this example may be 100 Hz, 200 HZ, 200 HZ, or any other sampling rate. In one aspect, the orientation may be determined once or less than once per full revolution of the rotor 320a. In another aspect, the orientation of the rotor may be determined multiple times before the rotor has completed a single revolution. For example, a sampling rate of 100 HZ may determine the orientation of the rotor 320a twice in a single revolution, when the rotor rotates at 3000 RPM.

At task 920, the angular displacement of the rotor around its axis of rotation, or the n-th derivative of the angular displacement is determined, based on the information obtained at task 910. In this example, n is an integer greater than zero and the n-th derivative of the angular displacement may be angular speed, angular acceleration, rate of angular acceleration, or any other derivative.

At task 930, the linear displacement of the vehicle 101 (e.g., distance traveled), or n-th derivative of the linear displacement, of the vehicle (e.g., speed, acceleration, rate of acceleration) is determined based on the information determined at task 920. The displacement, or displacement derivative, may be determined by using a transfer function, such as the one discussed with respect to task 630. At task 940, the operation of the vehicle 101 is controlled based on the information determined at task 940.

FIGS. 10A-C provide examples of how the information determined at task 930 may be used. At task 1010A, the information determined at task 930 (e.g., speed of vehicle or acceleration of the vehicle) may be used to close the control loop of the vehicle 101 when the vehicle control unit 210 is commanding a motion. For example, the vehicle control unit 210 may decide to increase the speed of the vehicle 101 by 5 mph. Following the decision, the vehicle control unit 210 may begin accelerating the vehicle. As the vehicle control unit 210 is accelerating the vehicle, the vehicle control unit 210 may perform the process 900 repeatedly and obtain measurements of the vehicle's speed. Once the desired speed is reached, the vehicle control unit may stop accelerating the vehicle. Similarly, the vehicle control unit 210 may perform the process 210 repeatedly and obtain measurements of the vehicle's 101 acceleration. When it is determined that the rate of acceleration exceeds a predetermined threshold, the vehicle control unit 210 may reduce the vehicle's rate of acceleration, thereby ensuring a smooth ride for the vehicle's passengers.

At task 1010B of FIG. 10B, the information determined at task 930 is used to validate readings obtained from a target sensor. The target sensor may be a GPS receiver, accelerometer, speedometer, odometer, or any other type of sensor used by the vehicle control unit 210 in controlling the operation of the vehicle 101. The target sensor may provide the same type of information as the information determined at task 930 based on the angular displacement of the rotor 320a. The information may be speed, acceleration, rate of acceleration, location, etc. When the information provided by the target sensor matches the information determined at task 930, information from the target sensor may be used in controlling the speed and direction of the vehicle 101. When the information from the target sensor does not match the information determined at task 930, vehicle 910 may stop using the feedback from the target sensor in controlling the speed or direction of the vehicle. The information obtained from the target sensor may be said to match the information determined at task 930 when the information obtained from the target sensor is the same, or within a predetermined distance, from the information determined at task 930.

In one example, the target sensor may be a speedometer. When a speed measurement obtained from the speedometer matches a speed determination based on the angular displacement of the rotor 320a, the speed measurement is said to be validated, and thus presumed correct. If, however, the speed measurement does not match the speed determination, the speed measurement may be deemed incorrect. The mismatch may be due to a failure of the speedometer or the connection between the speedometer and the vehicle control unit 210. In any event, a mismatch may indicate to the vehicle control unit 210 that information from the speedometer is not to be trusted. Accordingly, when a mismatch occurs, the vehicle control unit 210 may stop using data from speedometer in controlling the operation of the vehicle 101. For example, the vehicle control unit 210 may switch to using a control algorithm that does not rely on input from the speedometer.

At task 1010C of FIG. 10C, at least one of the direction and speed of the vehicle 101 is changed based on the information determined at task 930. For example, if it is determined that the vehicle 101 is moving at an excessive speed, the vehicle control unit 210 may slow down the vehicle. As there are numerous ways in which systems in a vehicle may benefit from knowledge of the vehicle's location, speed, acceleration, rate of acceleration, etc., the disclosure is not limited to any specific use of the information determined at task 930.

In one aspect, the process 900 may be executed repeatedly in real-time. For example, at time $t_1$, the vehicle control unit 210 may receive a measurement from the target sensor. Contemporaneously, at time $t_1$, the vehicle control unit 210 may execute tasks 910-930 and determine the vehicle 101's displacement, or the n-th derivative of the vehicle's displacement, based on the angular displacement (or the displacement's n-th derivative) of the rotor 320a. Afterwards, the vehicle control unit 210 may compare the information determined as a result of executing the tasks 910-930 to the information obtained from the sensor. Afterwards, at time $t_2$, the vehicle control unit 210 may receive another data sample from the target sensor, execute tasks 910-930, and compare the data sample from the data determined as a result of the process's execution. In other words, the above process may repeat itself continuously throughout the operation of the vehicle control unit 210. Times $t_1$ and $t_2$ may be time periods of length anywhere between a fraction of a second or several seconds (e.g., is, 5s, 60s, 300s).

In another aspect, the process 900 may be executed multiple times per second as part of a control routine that is repeatedly executed by the vehicle control unit 210 when controlling the operation of vehicle 101. The control routine may include receiving sensor readings (e.g., GPS readings, speed readings, acceleration readings, radar readings, or laser scanner readings), executing one or more control algorithms using the received sensor readings, and changing at least one of speed or direction of the vehicle 101 based on the outcome of the algorithms' outcome. In that regard, the process 900 may be used to supplement other data sources that are available to the vehicle control unit 210, such as a GPS receiver, a laser scanner, or a speedometer.

Figure 11:
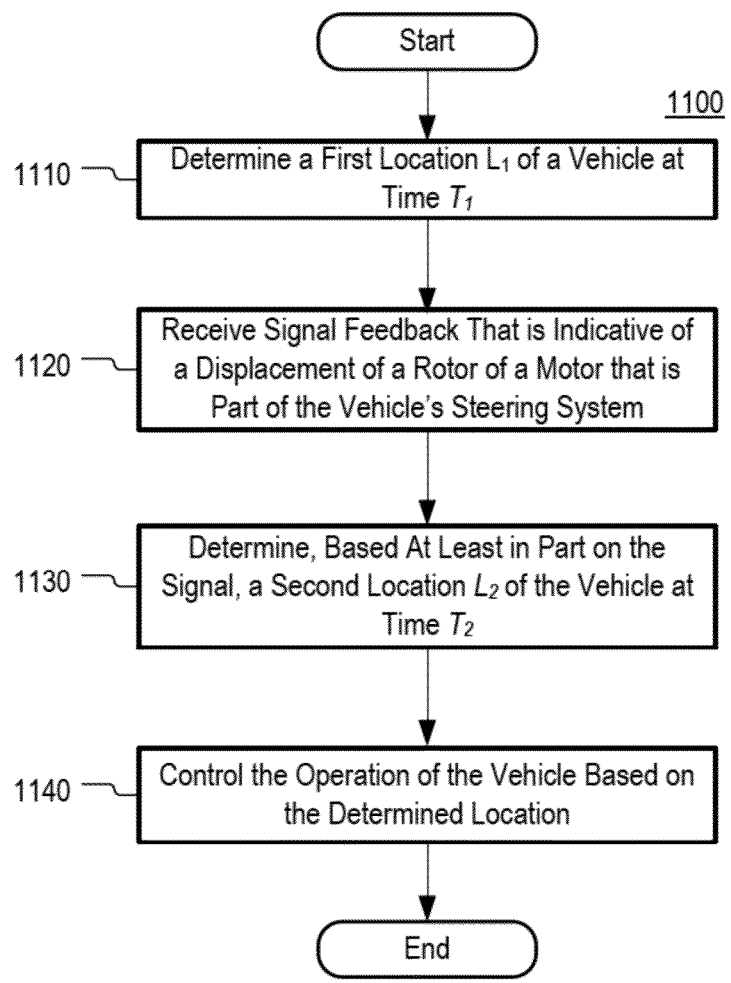
FIG. 11 depicts a flowchart of yet another process in accordance with aspects of the disclosure.

FIG. 11 depicts a flowchart of a process 1100 in accordance with aspects of the disclosure. At task 1110, a location $L_1$ is determined where the vehicle 101 is situated at time $T_1$. At task 1120, signal feedback is received that is indicative of the displacement of the rotor 440a. The signal feedback may include one or more digital signals or one or more analog signals or a combination of analog and digital signals.

In some aspects, each one of the digital/analog signals that is indicative of the angular displacement of the rotor 440a may be at least one of:

X1: a signal indicating a velocity of the of the rotor (e.g., speed and direction of the rotor);

X2: a signal indicating displacement of the rotor (e.g., 480°) during a predetermined time period;

X3: one or more signals that indicate orientation of the rotor at different time instants (e.g., position of rotor at time $T_1$ and position of the rotor at time $T_2$);

X4: a signal that indicates acceleration of the rotor;

X5: a signal that indicates a direction in which the rotor moves (e.g., clockwise or counterclockwise); and X6: a signal that indicates any other characteristic of the movement of the rotor 440a that affects the rotor's displacement.

In other aspects, the source of the signal may be one of:

Y1: a resolver, such as the resolver 450;

Y2: a rotary encoder;

Y3: a controller circuit that is used to drive the coils of the motor 440 (e.g., signals used by the controller to drive individual coils may be tapped into and used to determine rotor position, speed, acceleration, or another characteristic of movement; alternatively, Back Electromotive Force (BEMF) in one or more of the coils of the rotor 120 may be measured and used to determine the rotor's position, speed, or acceleration, or another characteristic of movement; and Y4: any other displacement measuring device that is capable of returning one of the signals X1-X6.

In any event, it should be understood that the disclosure is not limited to any specific type of signal that is indicative of the angular displacement of the rotor 440a within the stator 440b. Furthermore, there are numerous ways to measure the angular displacement of a rotor within an engine's stator and the disclosure is not limited to any specific one of them.

Specifically, in this example, at task 920, a first code and a second code is received from the resolver 350. The first code may be a coordinate that indicates the position of the rotor 440a within the stator 440b at time $T_1$. Similarly, the second code may be a coordinate that indicates the position of the rotor 440a within the stator 450a at time $T_2$. The codes may be either digital or analog codes. By way of example only, the position of the rotor may be expressed in reference to a magnetic axis of the rotor 440a and a reference point on the stator 440b. (e.g., as an angle between the magnetic axis and an axis across the reference point and the center of the rotor 440a.)

At task 1130, a location $L_2$ of the vehicle 101 is determined, via dead reckoning, based on the signal feedback received at task 1120. The location $L_2$ may be a location where the vehicle 101 is situated at time $T_2$ or another time that is different than the time $T_2$. As discussed above, the displacement of the rotor 440a of the steering motor 440 may be used to determine the steering positions of wheels 340a. This information, in turn, may be used to determine the trajectory followed by the vehicle 101. Provided that the velocity of the vehicle is known, determining the location $L_2$ based on the path followed by the vehicle 101 is a matter of a simple mathematical calculation. The velocity of the vehicle 101 may be determined using the process 600 of FIG. 6. Task 1130 is further discussed with respect to FIG. 12.

At task 1130, the operation of the vehicle 101 is controlled based on the determined location $L_2$. For example, the vehicle control unit 210 may use the braking system 250 or the steering 230 to slow down or steer the vehicle 101. As there are numerous ways in which systems in a vehicle may benefit from knowledge of the vehicle's location, the disclosure is not limited to any specific use of the location $L_2$ determined at task 930.

Figure 12:
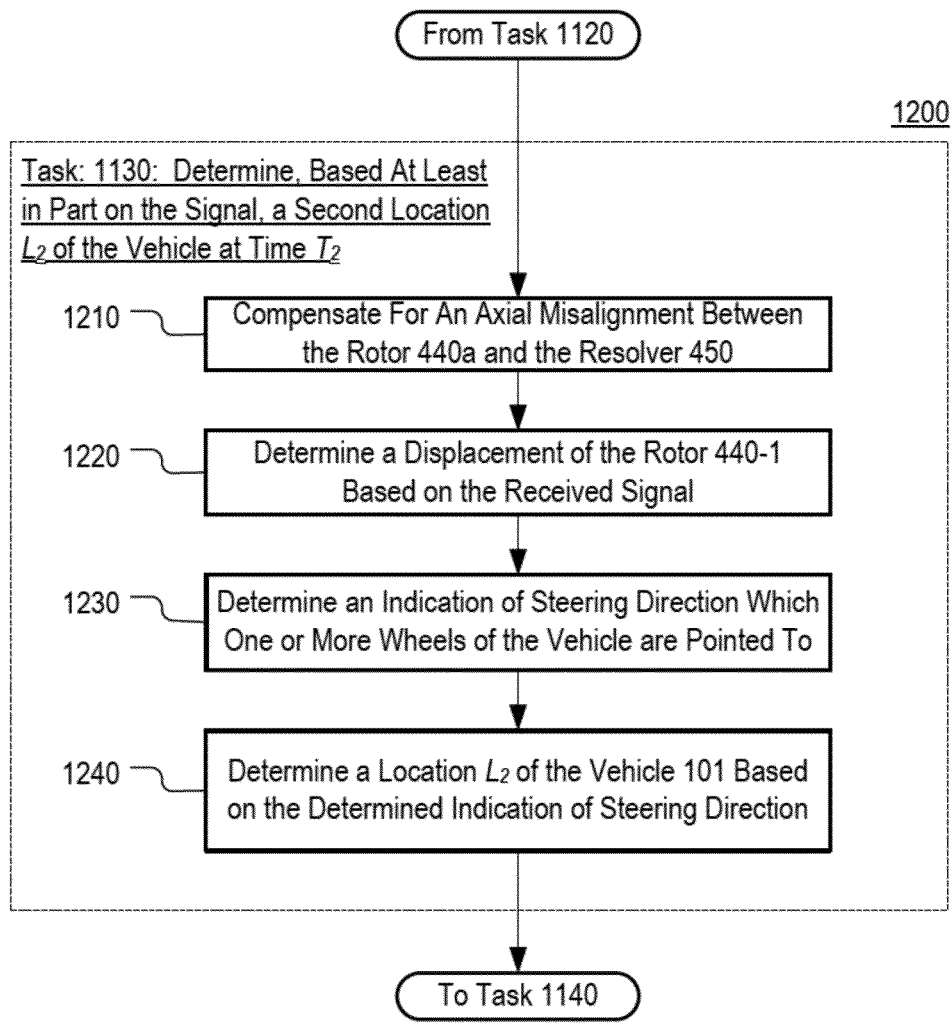
FIG. 12 depicts a flowchart of a process associated with the process of FIG. 11.
Figure 13:
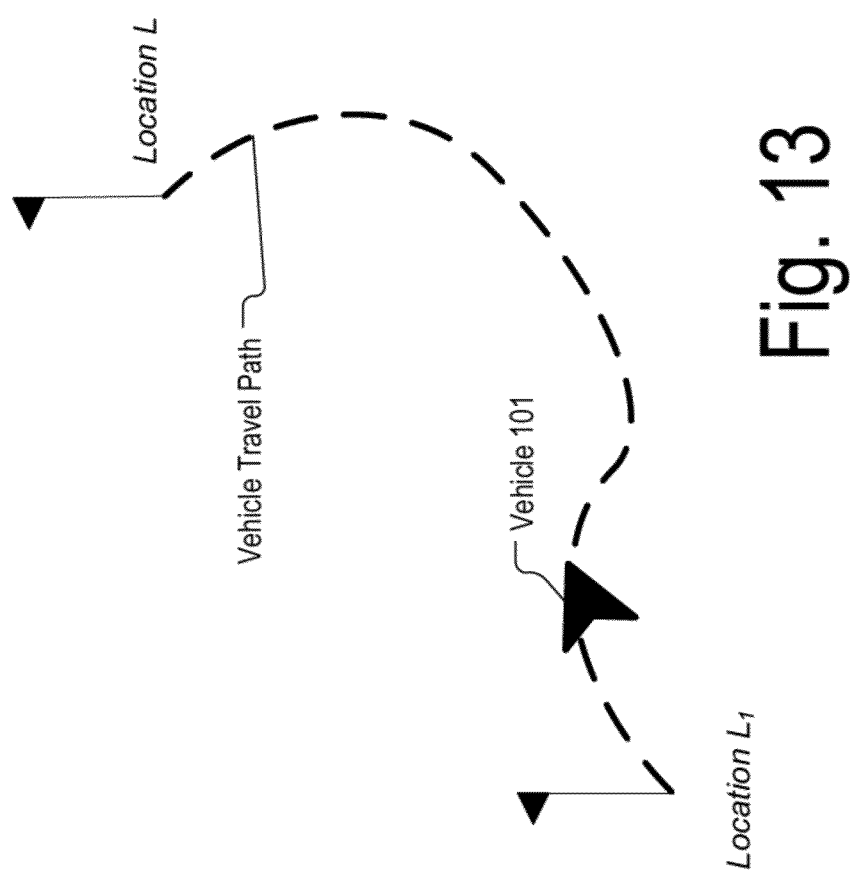
FIG. 13 depicts a schematic diagram of the vehicle of FIG. 1 traveling from a first location to a second location.

FIG. 12 depicts a flowchart of an example process 1000 directed to determining the location of the vehicle 101 based on a signal feedback indicating an angular displacement of the rotor 440a inside the steering motor 440. At task 1210, an adjustment to the signal may be performed by applying a transfer function that removes noise due to misalignment of the rotor 440a and the resolver 450, in the manner discussed above. At task 1220, the displacement of the rotor 440a is determined based on the signal feedback received from the resolver 450. At task 1230, an indication of the steering position of the wheels 340a and 340b is determined. By way of example, the indication may one or more of:

I1: angle offset of the wheels 340a and 340b, in the vehicle left-right direction, from the neutral steering position;

I2: angle offset of the wheels 340a and 340b relative to an axle which the wheels are mounted on;

I3: direction which the wheels are pointed to (e.g., 10° to the vehicle left or right); and I4: angular displacement of at least one of the wheels 340a and 340b about a steering axis.

In some aspects, the indication of steering position may be determined based on a transfer function that maps the signal feedback received at task 1120 to the indication of steering position. For example, one such transfer function may map each complete revolution of the rotor 440a in a left direction to a 5° degree offset of the wheels 340a and 340b, from their previous steering position. The function may be determined analytically based on the physics of the steering system 230 and other relevant components. Alternatively, the function may be determined empirically by running the steering motor 440, recording signals that are indicative of the angular displacement of the rotor 440a as a result of its running, measuring and recording changes in the steering position of the wheels 340a and 340b that result from the motor's running, and fitting the function based on the changes in steering position and the recorded signals.

Figure 14:
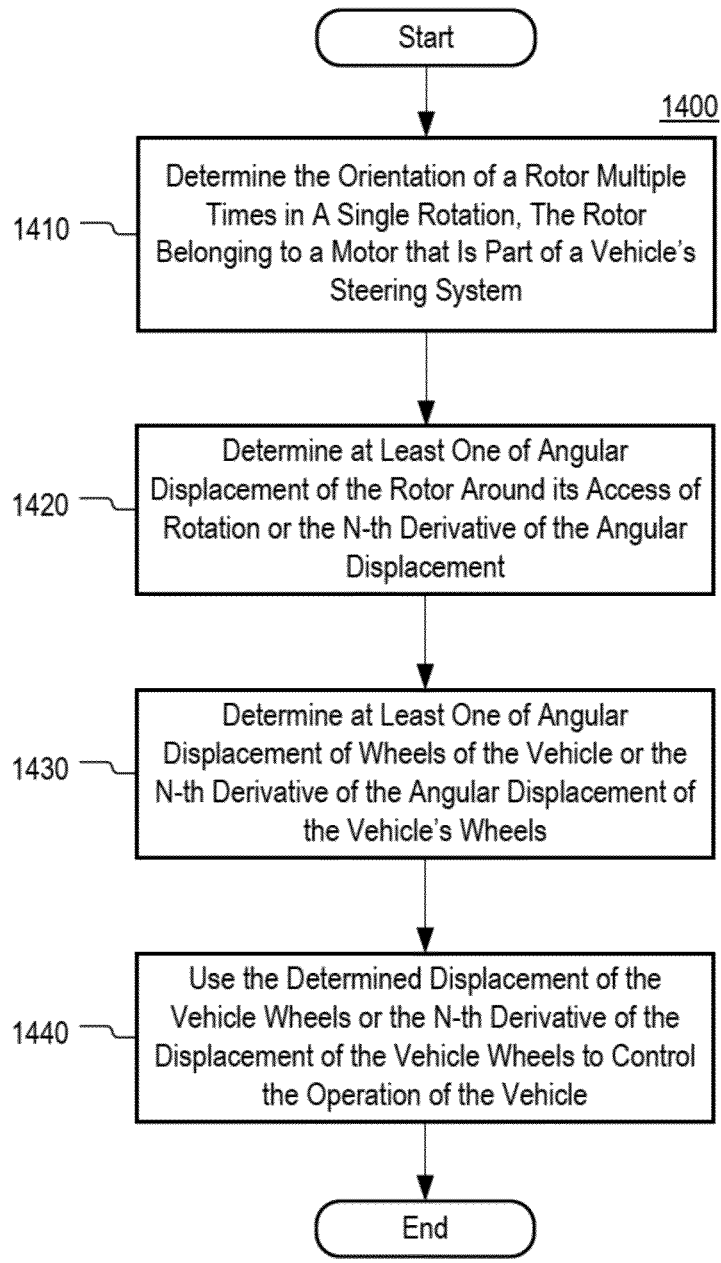
FIG. 14 depicts a flowchart of yet another process in accordance with aspects of the disclosure.

At task 1240, a location $L_2$ of the vehicle 101 is determined based on the steering position of the wheels 340a and 340b. The shape of the travel path of the vehicle 101 may be determined based on the indication of steering direction determined at task 1230, speed of the vehicle, duration of a period for which the wheels are in given steering position (e.g., 10° offset from the neutral steering position). Once the travel path is determined, dead reckoning or another navigation technique may be used to infer location $L_2$ based on the location $L_1$ and the determined trajectory. It should be noted that a number of different intermediate calculations may be performed to determine a vehicle's trajectory based on one or more steering positions of the vehicle's wheels. The disclosure is not limited to any specific one of them FIG. 14 depicts a flowchart of a process 1400 in accordance with aspects of the disclosure. At task 1410, the orientation of the rotor 440a is determined by sampling the signal from the resolver 450 (or another measuring device) at a predetermined sampling rate. The sampling rate in this example may be 100 Hz, 200 HZ, 200 HZ, or any other sampling rate. In one aspect, the orientation may be determined once or less than once per full revolution of the rotor. In another aspect, the orientation of the rotor may be determined multiple times before the rotor has completed a single revolution. For example, a sampling rate of 100 HZ may determine the orientation of twice the orientation of the rotor 440a when the rotor rotates at 3000 RPM.

At task 1420, one of angular displacement of the rotor around its axis of rotation, or the n-th derivative of the angular displacement, is determined based on the information obtained at task 1410. In this example, n is an integer greater than or equal to one, and the n-th derivative of the angular displacement may be angular speed, angular acceleration, rate of angular acceleration, or any other derivative.

At task 1430, the angular displacement of the wheels 340a-b of vehicle 101 (e.g., distance traveled) or n-th derivative of the angular displacement of the wheels is determined based on the information obtained at task 1420. The angular displacement, or its n-th derivative may determined as discussed with respect to task 1230. The angular displacement may be relative to the steering axis S or any other axis. At task 1440, the operation of the vehicle 101 is controlled based on the information determined at task 1430.

FIGS. 15A-C provide examples of how the information determined at task 1430 may be used to control the operation of the vehicle 101. At task 1510A, the information determined at task 1430 may be used to close the control loop of the vehicle 101 when the vehicle control unit 210 is commanding a motion. For example, the vehicle control unit 210 may decide to steer the vehicle 5° to the left. Following the decision, the vehicle control unit 210 may begin steering the vehicle using the steering motor 440. As the vehicle control unit 210 is steering the vehicle, the vehicle control unit 210 may perform the process 1400 continuously and repeatedly obtain measurements of the how far to the left (or right) have the wheels 340a-b been steered. Once the desired wheels are steered far enough, the vehicle control unit may stop turning the steering motor 440. Similarly, the vehicle control unit 210 may repeatedly obtain measurements of the rate of angular acceleration of the vehicle's wheels by executing tasks 1410-1430 repeatedly. When it is determined that the rate of acceleration exceeds a predetermined threshold, the vehicle control unit 210 may reduce the vehicle's rate of acceleration thereby ensuring that the vehicle 101 does not turn too abruptly.

At task 1510B of FIG. 15B, the information determined at task 1430 is used to validate readings obtained from a target sensor. The target sensor may be any sensor that measures the orientation of the wheels 340a-b, the speed of rotation of the wheels 340a-b, the acceleration of rotation of the wheels 340a-b, etc. The target sensor may provide the same type of information as the information determined at task 1430 based on the angular displacement of the rotor 450. When the information provided by the target sensor matches the information determined at task 930, information from the target sensor may be used in controlling the speed and direction of the vehicle 101. When the information from the target sensor does not match the information determined at task 1430, vehicle 1010 may stop using the feedback from the target sensor in controlling the speed or direction of the vehicle. As discussed with respect to task 1010B, task 1510B may also be executed continuously and/or in real-time.

At task 1510C of FIG. 15C, at least one of direction and speed of the vehicle is changed based on the information determined at task 1430 As there are numerous ways in which systems in a vehicle may benefit from knowledge of direction in which the vehicle wheels are turned to, speed of turning the vehicle wheels, etc., the disclosure is not limited to any specific use of the information determined at task 1430.

In one aspect, the process 1400 may be executed repeatedly in real-time. For example, at time $t_1$, the vehicle control unit 210 may receive a measurement from the target sensor. Contemporaneously, at time $t_1$, the vehicle control unit 210 may execute tasks 1410-1430 and determine the orientation of the wheels 340a-b of the vehicle 101. Afterwards, the vehicle control unit 210 may compare the information determined as a result of executing the tasks 1510-1530 to the information obtained from the sensor. Afterwards, at time $t_2$, the vehicle control unit 210 may receive another data sample from the target sensor, execute tasks 1410-1430, and compare the data sample from the data determined as a result of the process's execution. In other words, the above process may repeat itself continuously throughout the operation of the vehicle control unit 210. Times $t_1$ and $t_2$ may be time periods of length anywhere between a fraction of a second or several seconds (e.g., 1s, 5s, 60s, 300s).

In another aspect, the process 1400 may be executed multiple times per second as part of a control routine that is repeatedly executed by the vehicle control unit 210 when controlling the operation of vehicle 101. The control routine may include receiving sensor readings (e.g., GPS readings, speed readings, acceleration readings, radar readings, laser scanner readings), executing one or more control algorithms using the received sensor readings, and changing at least one of speed or direction of the vehicle 101 based on the outcome of the algorithms' outcome. In that regard, the process 1400 may be used to supplement other data sources that are available to the vehicle control unit 210, such as GPS receiver, laser scanner, or speedometer.

FIGS. 6-15 are provided as examples only. At least some of the tasks may be performed in a different order than represented, performed concurrently or altogether omitted. It should be noted that the processes of FIGS. 6-15 may be performed, at least in part, by the vehicle control unit 210 or another device used in controlling the operation of the vehicle. Although, the techniques for determining vehicle location are described in the context of autonomous vehicles, it will be understood that the same techniques may be used in non-autonomous or semi-autonomous vehicles as part of any vehicle system that uses information concerning the vehicle's location or steering position of the wheels of the vehicle. In addition, although in the above examples, the motor 320 is an electric motor, in other examples, the motor 350 may be a rotary combustion engine, such as a Wankel engine. Furthermore, although in the example of FIG. 8, the calculated velocity is adjusted to compensate for rotor axial misalignment and clutch disengagement, in other examples another characteristic of the movement of the rotor 320a or another characteristic of the movement of the wheels 340 (or the vehicle 101 may be adjusted).

It should further be noted that the disclosure is not limited to automotive applications only. For example, feedback signal that is indicative of the displacement of a rotor may be used to determine the position of boat control surfaces (e.g., rudder), position of boat propellers relative to a longitudinal axis of a boat, airplane control surfaces (e.g., flaps or elevators) or any other type of control surface or element that is coupled the rotor. Most of the foregoing examples are not mutually exclusive, but may be implemented in various combinations to achieve unique advantages.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A vehicle comprising:
an acceleration system;
a steering system;
a braking system;
a speedometer;
a power train including an electric motor, the electric motor including a first rotor disposed with a first stator;
a displacement measuring device coupled to the first rotor; and
one or more processors coupled to one or more of the steering system, the acceleration system, and the braking system, the processor being configured to:
when operating the vehicle in an autonomous driving mode, use the speedometer to control the braking system, the steering system, and the acceleration system;

receive, from the displacement measuring device, a signal that indicates an orientation of the first rotor relative to the first stator;

filter the received signal to remove noise;

determine at least one of displacement of the first rotor or a derivative of displacement of the first rotor based on the filtered received signal;

determine velocity of the vehicle based on the displacement of the first rotor or the derivative of displacement;

receive information from the speedometer identifying a speed of the vehicle;

compare the speed of the vehicle to the determined velocity to determine whether the speed of the vehicle matches the determined velocity; and when the speed of the vehicle does not match the determined velocity, stop using the speedometer to control the braking system, the steering system, and the acceleration system and operating at least one of the braking system, the steering system, and the acceleration system using the determined velocity.

2. The vehicle of claim 1, wherein:

the signal is sampled by the one or more processors at a predetermined sampling rate to produce one or more signal samples;

the displacement or derivative of displacement of the rotor is determined based on the one or more signal samples; and the displacement or derivative of displacement of the rotor is determined repeatedly at a rate of multiple times per second.

3. The vehicle of claim 1, wherein the displacement measuring device is a resolver.

4. The vehicle of claim 1, wherein:

the displacement measuring device includes a second rotor coupled to the first rotor of the electric motor; and the displacement measuring device is configured to generate the signal as an adjusted signal using a transfer function that compensates for misalignment between the first rotor and the displacement measuring device.

5. The vehicle of claim 1, wherein:

the vehicle further comprises a clutch; and the one or more processors are further configured to detect whether the clutch is engaged or disengaged; and wherein the at least one of the braking system, the steering system, and the acceleration system is operated based on the determined displacement of the rotor or the derivative of the displacement of the rotor only when it is determined that the clutch is engaged.

6. The vehicle of claim 1 wherein the signal further indicates at least one of speed, direction of rotation, displacement, or acceleration of the first rotor.

7. A method for controlling the operation of a vehicle, the vehicle having a motor that is part of a power train of the vehicle, the motor having a first rotor and a first stator, the method comprising:

when operating the vehicle in an autonomous driving mode, using, by one or more processors, the speedometer to control the braking system, the steering system, and the acceleration system;

receiving, by the one or more processors, a first signal indicating a first value for the speed of the vehicle, the first signal being produced by a speedometer of the vehicle;

receiving, by the one or more processors, a second signal indicating an orientation of the first rotor relative to the first stator, the second signal being produced by a second device that is coupled to the first rotor;

determining, by the one or more processors, based on the at least one of the angular displacement of the first rotor and a derivative of the angular displacement of the first rotor, a derivative of the displacement of the vehicle;

comparing, by the one or more processors, the first value with the second value to determine whether the first value matches the second value; and when the first value does not match the second value, stopping, by one or more processors, the use of the speedometer to control the braking system, the steering system, and the acceleration system and operating, by the one or more processors, at least one of the braking system, the steering system, and the acceleration system based on the received first signal.

8. The method of claim 7, wherein the second device is one of a resolver or a rotary encoder.

9. The method of claim 7, wherein the second value is determined based on a speed ratio of a coupling between the first rotor and a second rotor of the second device.

10. The method of claim 7, wherein:

the second signal is sampled at a predetermined sampling rate; and the at least one of the angular displacement of the first rotor and the derivative of the angular displacement of the rotor is determined based on at least two samples of the second signal.

11. A system comprising one or more processors, the one or more processors being configured to:

when operating the vehicle in an autonomous driving mode, use speed information received from a speedometer to control the braking and acceleration of a vehicle;

receive, from a measuring device, a signal that indicates a position of a first rotor of a motor of the vehicle;

determine at least one of displacement of the first rotor or a derivative of displacement of the first rotor based on the received signal;

determine velocity of the vehicle based on the displacement of the first rotor or the derivative of displacement;

compare the speed information to the determined velocity to determine whether the speed of the vehicle matches the determined velocity; and when the speed of the vehicle does not match the determined velocity, stop using the speedometer to control the braking and the acceleration of the vehicle and control at least one of the braking and acceleration of the vehicle using the determined velocity.

12. The system of claim 11, further comprising the speedometer.

13. The system of claim 11, further comprising the vehicle.

14. The system of claim 11, further comprising the measurement device.

15. The system of claim 14, wherein the measuring device includes a second rotor coupled to the first rotor, and the measuring device is configured to generate the signal as an adjusted signal using a transfer function that compensates for misalignment between the first rotor and the measuring device.

16. The system of claim 11, wherein the one or more processors are further configured to:

sample the signal at a predetermined sampling rate to produce one or more signal samples, and wherein the displacement or derivative of displacement of the rotor is determined based on one or more signal samples.

17. The system of claim 11, wherein the measuring device includes a resolver.

18. The system of claim 11, wherein the vehicle further comprises a clutch, and the one or more processors are further configured to detect whether the clutch is engaged or disengaged, and the controlling of the at least one of the braking and acceleration of the vehicle is further based on whether the clutch is engaged.

19. The system of claim 11, wherein the signal further indicates at least one of speed, direction of rotation, displacement, or acceleration of the first rotor.

20. The system of claim 11, wherein the speed of the vehicle does not match the determined velocity when the speed of the vehicle and the determined velocity are within a predetermined distance of one another.

* * * * *